United States Patent
Manabe

(10) Patent No.: US 8,368,779 B2
(45) Date of Patent: Feb. 5, 2013

(54) IMAGE PROCESSING APPARATUS FOR PERFORMING GRADATION CORRECTION ON SUBJECT IMAGE

(75) Inventor: Yoshitsugu Manabe, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 683 days.

(21) Appl. No.: 12/540,518

(22) Filed: Aug. 13, 2009

(65) Prior Publication Data
US 2010/0053384 A1 Mar. 4, 2010

(30) Foreign Application Priority Data

Aug. 27, 2008 (JP) ................ P2008-218500

(51) Int. Cl.
*H04N 9/68* (2006.01)
*H04N 5/235* (2006.01)
(52) U.S. Cl. .............. 348/235; 348/229.1; 348/241; 348/255; 382/274
(58) Field of Classification Search .......... 358/521; 348/235
See application file for complete search history.

(56) References Cited

U.S. PATENT DOCUMENTS

| | | | |
|---|---|---|---|
| 6,816,603 B2* | 11/2004 | David et al. | 382/107 |
| 7,420,623 B2 | 9/2008 | Nakakuki | |
| 7,738,699 B2* | 6/2010 | Tsuruoka et al. | 382/169 |
| 7,843,493 B2* | 11/2010 | Katagiri et al. | 348/222.1 |
| 2005/0226526 A1 | 10/2005 | Mitsunaga | |
| 2008/0007634 A1* | 1/2008 | Nonaka et al. | 348/234 |
| 2008/0008382 A1 | 1/2008 | Matsushima | |
| 2008/0043120 A1 | 2/2008 | Mitsunaga | |
| 2008/0129860 A1* | 6/2008 | Arakawa | 348/363 |

FOREIGN PATENT DOCUMENTS

| | | |
|---|---|---|
| EP | 1 494 462 A1 | 1/2005 |
| EP | 1 868 374 A2 | 12/2007 |
| JP | 06-030330 A | 2/1994 |
| JP | 2003-116049 A | 4/2003 |
| JP | 2004-038842 A | 2/2004 |
| JP | 2005-260517 A | 9/2005 |
| JP | 2006-034987 A | 2/2006 |

OTHER PUBLICATIONS

Japanese Office Action dated Feb. 15, 2011 (and English translation thereof) in counterpart Japanese Application No. 2008-218500.
Extended European Search Report (EESR) dated Feb. 24, 2012 (in English) in counterpart European Application No. 09167221.2.

* cited by examiner

*Primary Examiner* — Ngoc-Yen Vu
(74) *Attorney, Agent, or Firm* — Holtz, Holtz, Goodman & Chick, PC

(57) ABSTRACT

An image processing apparatus includes: a gradation correction unit configured to perform gradation correction upon a subject image to be processed to generate a corrected image, the gradation correction including processing for lowering contrast in the subject image; a gradation information acquisition unit configured to acquire gradation information indicating relative balance of brightness in each portion of the subject image; and an adjustment unit configured to adjust brightness of the corrected image on a pixel basis based on the gradation information.

16 Claims, 17 Drawing Sheets

FIG.4

|  |  | FIRST KEY DETERMINATION RESULT (REGION A) | | |
|---|---|---|---|---|
|  |  | LOW | MIDDLE | HIGH |
| SECOND KEY DETERMINATION RESULT (REGION B) | LOW | LOW1 | LOW2 | MIDDLE1 |
|  | MIDDLE | MIDDLE1 | MIDDLE1 | MIDDLE2 |
|  | HIGH | MIDDLE2 | HIGH1 | HIGH2 |

FIG.6A
$$g(lev, x) = \frac{MAX \times lev + Vin^x / MAX^{x-1}}{MAX + Vin \times lev}$$
Vin: INPUT V (0-MAX)
lev: GAIN LEVEL (1- )
x: ORDER (1- )
g (lev, x): GAIN FUNCTION
FIG.6B
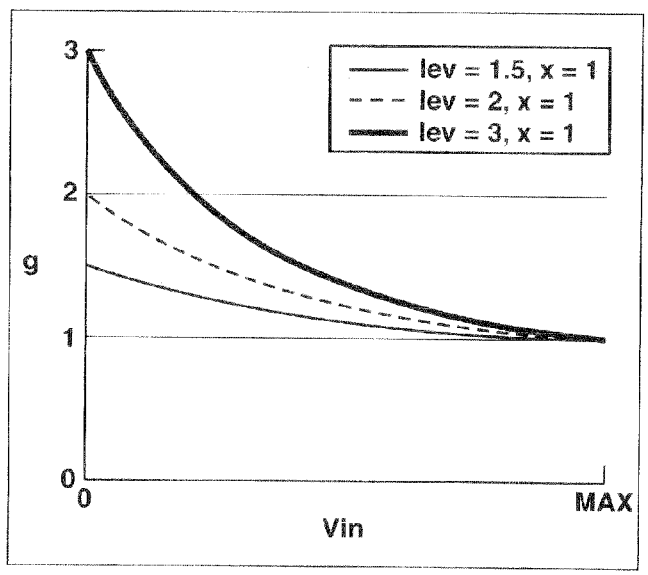
FIG.6C
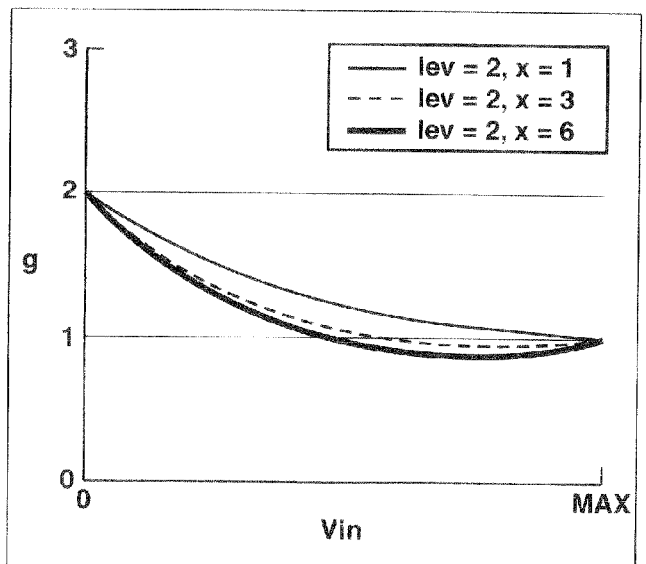

FIG.7A
glim (lev, x) = min {g (lev, x), (lev − 1.0) × lim + 1.0}
lim: GAIN LIMITING COEFFICIENT (0-1)
min: FUNCTION FOR OBTAINING MINIMUM NUMERIC VALUE IN ARGUMENT LIST
glim (lev, x): GAIN FUNCTION (GAIN-LIMITED)
FIG.7B
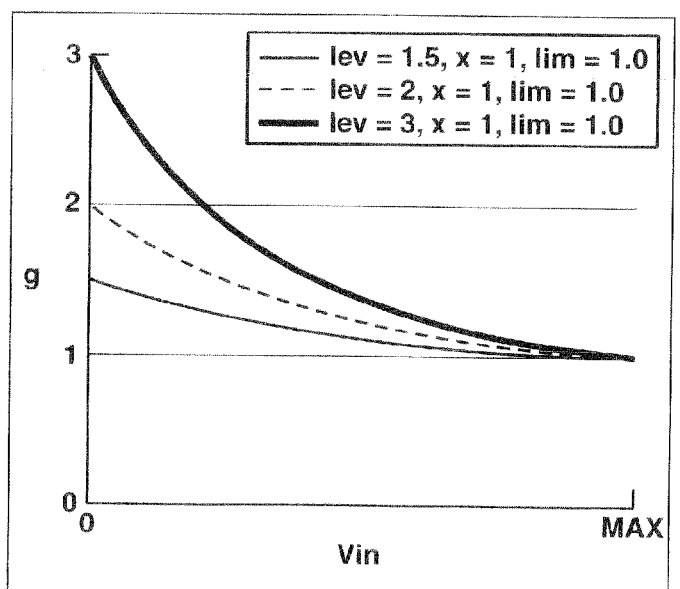
FIG.7C
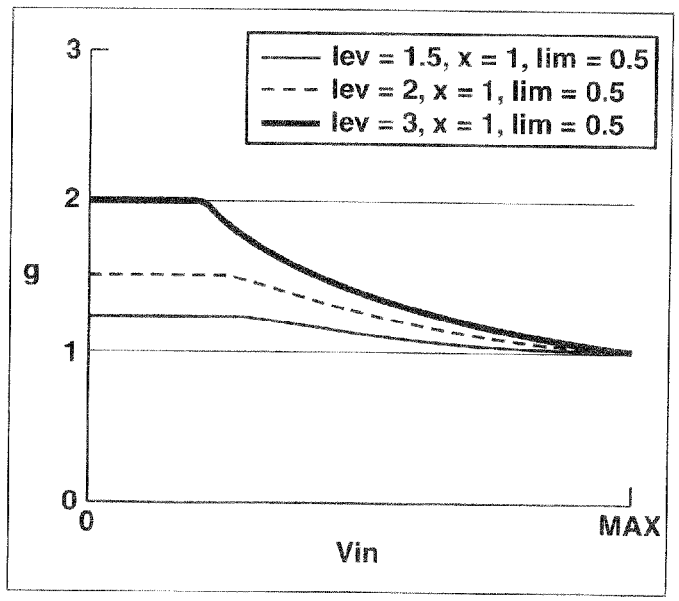

FIG.8

| NUMBER OF LOW1 | NUMBER OF HIGH2 | GAIN LIMITING COEFFICIENT lim |
|---|---|---|
| NOT SMALLER THAN N | NOT SMALLER THAN M | 1.0 |
|  | SMALLER THAN M | 0.9 |
| SMALLER THAN N | NOT SMALLER THAN M | 0.6 |
|  | SMALLER THAN M | 0.5 |

FIG.9A
gclip (lev, x) = max {glim (lev, x), 1.0}
max: FUNCTION FOR OBTAINING MAXIMUM NUMERIC VALUE IN ARGUMENT LIST
glim (lev, x): GAIN FUNCTION (CLIPPED)
FIG.9B
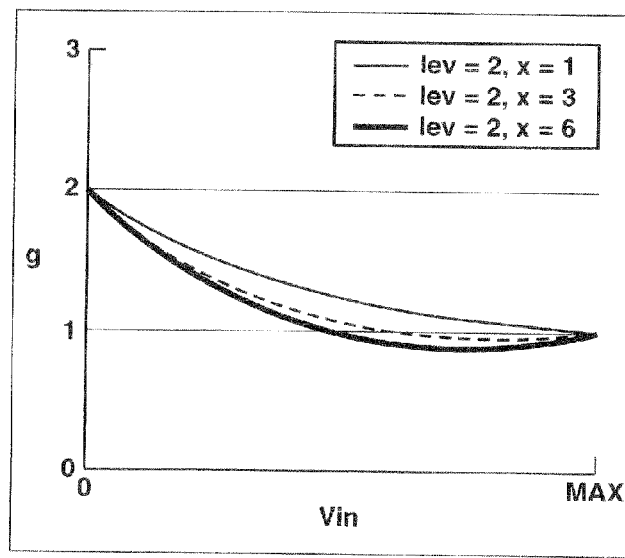
FIG.9C
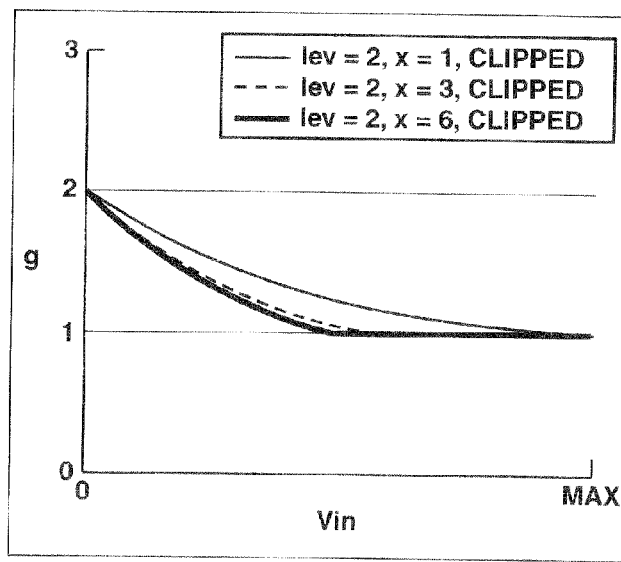

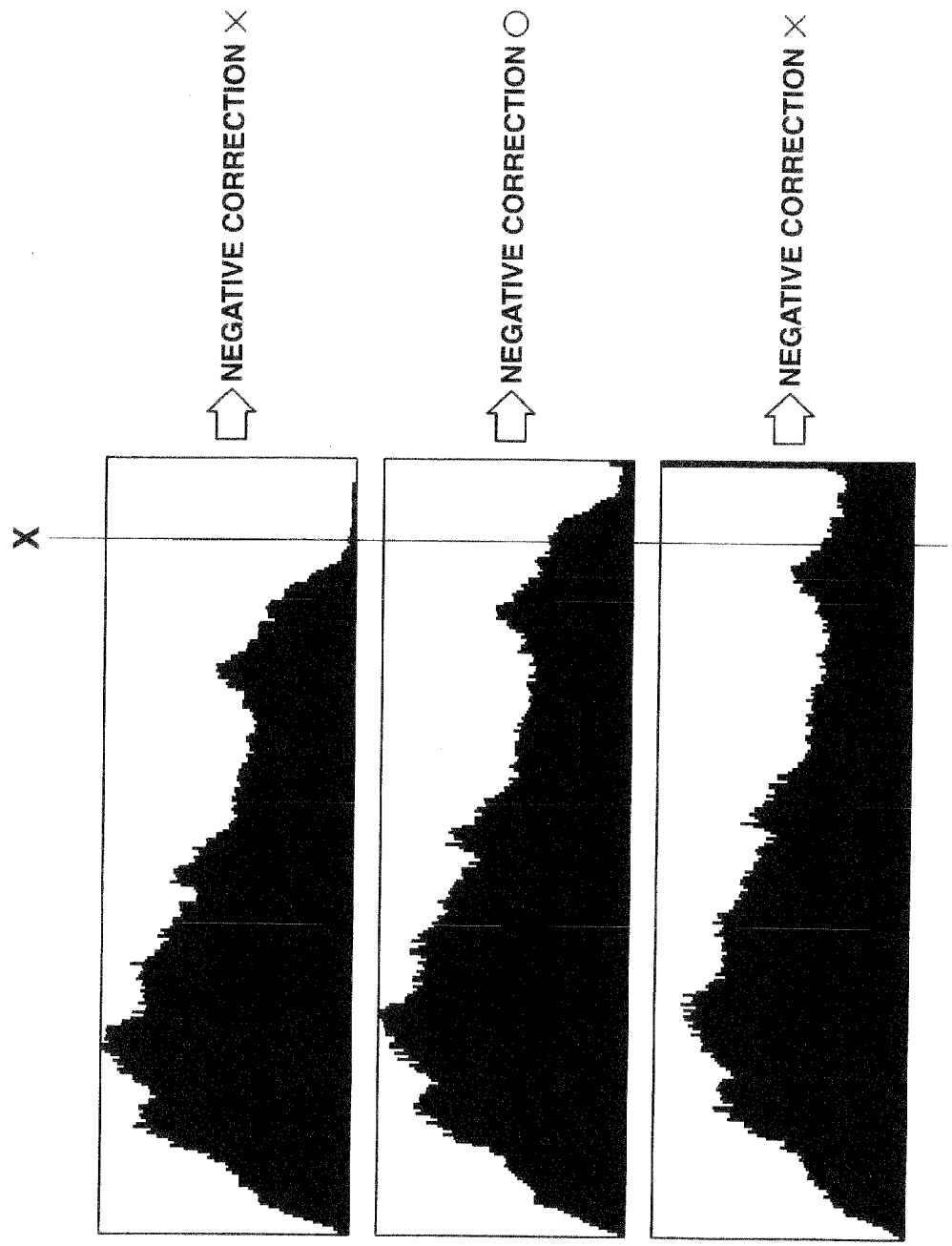

IMAGE PROCESSING APPARATUS FOR PERFORMING GRADATION CORRECTION ON SUBJECT IMAGE

CROSS-REFERENCE TO THE RELATED APPLICATION(S)

The present application is based upon and claims priority from prior Japanese Patent Application No. 2008-218500, filed on Aug. 27, 2008, the entire content of which are incorporated herein by reference.

TECHNICAL FIELD

The present invention relates to an image processing apparatus, an image processing method and an image processing program which are, for example, suitable for use in a digital camera.

BACKGROUND

Conventionally, there is proposed a technique in which, for performing exposure control in an image pickup device, a backlight level showing an intensity of backlight is detected based on a luminance level in a low luminance level region and a luminance level in another region in an image, and control parameters for gradation correction (gamma correction) are set to raise the luminance level in the low luminance level region in accordance with the backlight level. An example of such technique is disclosed in JP-A-2003-116049.

In the conventional technique, gradation is expanded in the low luminance level region so that contrast can be emphasized in a local region with a low luminance level.

The conventional technique, which for correcting gradation to raise the luminance level in a low luminance level region so as to emphasize contrast in a local region with a low luminance level in an image, can be applied not only to setting of control parameters in exposure control but also to image processing aimed at adjustment of the quality of a picked-up image which has been acquired by a device such as an image pickup device.

In the conventional technique however, since gradation correction is performed to raise the luminance level in a low luminance level region, the luminance level after the gradation correction becomes much higher than the luminance level before the gradation correction in the low luminance level region.

As a result of the gradation correction a difference in luminance level (contrast) between the low luminance level region and a high luminance level region is inevitably reduced in the image as a whole. That is, in the technique according to the background art, there is a problem that the global contrast of the image is lowered due to the gradation correction.

SUMMARY

One of the objects of the present invention is to provide an image processing apparatus, an image processing method and an image processing program which can perform processing to lower contrast for gradation correction of an image to thereby finally obtain a high quality image without lowering the global contrast of the image.

According to an aspect of the invention, there is provided an image processing apparatus including: a gradation correction unit configured to perform a gradation correction upon a subject image to be processed to generate a corrected image the gradation correction including processing for lowering contrast in the subject image; a gradation information acquisition unit configured to acquire gradation information indicating relative balance of brightness in each portion of the subject image, and an adjustment unit configured to adjust brightness of the corrected image on a pixel basis based on the gradation information.

According to another aspect of the invention, there is provided a method for processing an image, the method including: performing gradation correction upon a subject image to be processed to generate a corrected image, the gradation correction including processing for lowering contrast in the subject image; acquiring gradation information indicating relative balance of brightness in each portion of the subject image; and adjusting brightness of the corrected image on a pixel basis based on the gradation information.

According to another aspect of the invention there is provided a computer readable medium containing a software program executable by a computer system, the software program including a sequence of instructions for causing the computer system to perform a process including: performing gradation correction upon a subject image to be processed to generate a corrected image the gradation correction comprising processing for lowering contrast in the subject image; acquiring gradation information indicating relative balance of brightness in each portion of the subject image; and adjusting brightness of the corrected image on a pixel basis based on the gradation information.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 4 is a table showing the correspondence relationship between a combination of first and second brightness levels and a third brightness level.

FIGS. 6A-6C are explanatory views showing a basic gain function and a characteristic of a variation of a gain with respect to a variation of a V-value obtained by the gain function.

FIGS. 7A-7C are explanatory views showing a basic gain function and a characteristic of a variation of a gain with respect to a variation of a V-value obtained by the gain function.

FIG. 8 is a table showing a method for setting a gain limiting coefficient.

FIGS. 9A-9C are explanatory views showing a clipped gain function and a characteristic of a variation of a gain with respect to a variation of a V-value obtained by the gain function.

FIGS. 10A-10C are histograms showing a highlight determination method.

DETAILED DESCRIPTION

Figure 1:
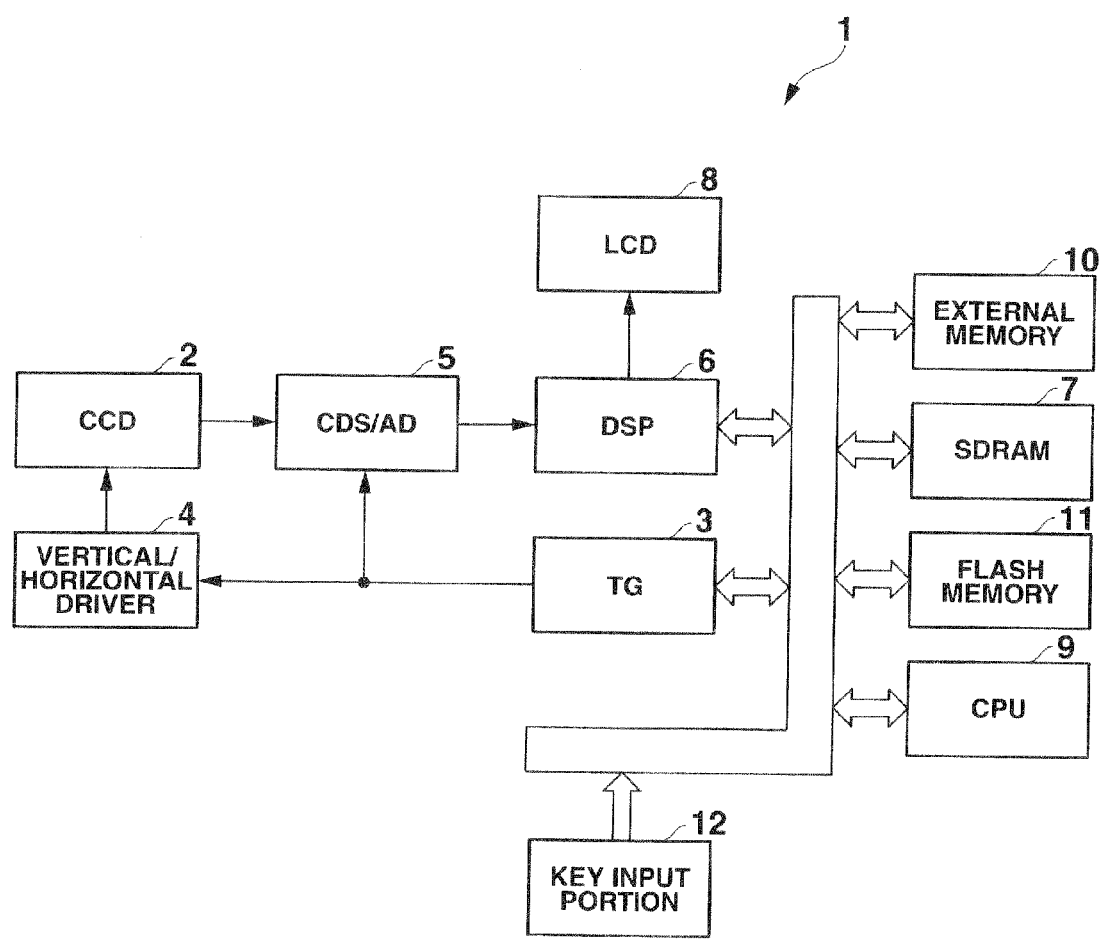
FIG. 1 is a block diagram showing the schematic configuration of a digital camera according to the invention.

An embodiment of the invention will be described below with reference to the drawings. FIG. 1 is a block diagram showing the schematic configuration of a digital camera 1 including an image processing apparatus according to the invention.

The digital camera 1 has a CCD 2 as an image pickup device. The CCD 2 has a photosensitive surface in which a Bayer array of primary color filters is provided. The CCD 2 is driven by horizontal and vertical transfer driving signals supplied from a horizontal/vertical driver 4 based on a timing signal generated by a timing generator (TG) 3. The CCD 2 thus driven converts an optical image of a subject imaged by a not-shown optical system into an electric signal (image pickup signal). An output signal of the CCD 2 is supplied to a CDS/AD circuit 5, where noise reduction is performed on the signal by correlated double sampling while the signal is converted into a digital signal. The converted image pickup signal (Bayer data) is supplied to a digital signal processor (DSP) 6.

The DSP 6 performs various kinds of digital signal processing including RGB conversion for generating R, G and B color component data (RGB data) for each pixel from the Bayer data, YUV conversion for converting the RGB data into YUV data containing a luminance signal (Y signal) and color difference signals (Cb (U) signal and Cr (V) signal), etc. The YUV data converted by the DSP 6 are stored in an SDRAM (Synchronous DRAM) 7 sequentially. In addition, in standby for photographing in a recording mode, the YUV data are sent to an LCD (Liquid Crystal Display) 8 and displayed on a screen as a live view image whenever a frame of data (image data) are accumulated. Further, when a still image is taken, the YUV data temporarily stored in the SDRAM 7 are finally compressed by a CPU 9 and recorded on an external memory 10.

The external memory 10 is a memory card which can be removably attached to a camera body to which the external memory 10 is connected through a not-shown card interface. In a reproducing mode, in accordance with an operation selected by a user, an image file recorded on the external memory 10 is read by the CPU 9 and expanded and developed as YUV data on the SDRAM 7. After that, the YUV data are sent to the LCD 8, reproduced and displayed as a still image.

A flash memory 11 is a program memory, in which various programs or data for allowing the CPU 9 to control the camera as a whole are stored. The various programs and data include a program for allowing the CPU 9 to make AE or AWB control, a program for allowing the CPU 9 to serve as an adjustment unit and a gradation information correction unit according to the invention, and various kinds of data for use in the programs.

A key input portion 12 includes various operation keys required for a user to operate the digital camera 1, such as a power key, a shutter key, and a mode setting key for setting a recording mode or a reproducing mode. The operation state of each operation key is detected sequentially by the CPU 9.

Figure 2:
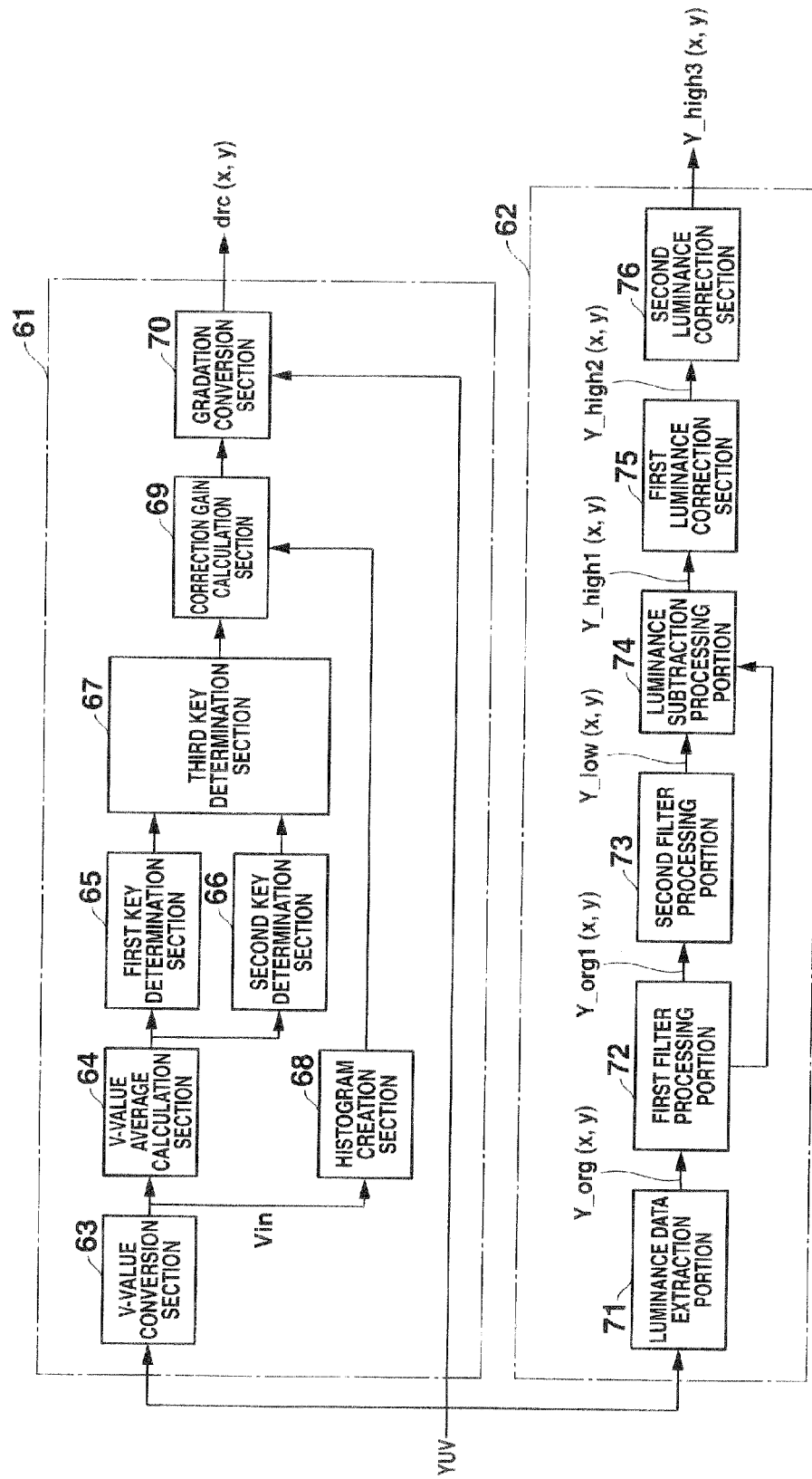
FIG. 2 is a block diagram showing a main portion of a DSP.

FIG. 2 is a block diagram partially showing the configuration of the DSP 6. The DSP 6 includes a gradation correction section 61 and an adjusted data generation section 62. The gradation correction section 61 performs processing (which will be described later) for correcting gradation of a photographed image (image to be processed) upon the YUV data which are image data generated in a still image pickup mode, and supplies the gradation-corrected image data (drc(x, y)) to the CPU 9. The adjusted data generation section 62 generates third contrast component data (Y_high3(x, y)) which will be described later and which are used for adjusting the contrast balance of the image (corrected image) based on the gradation-corrected image data, and supplies the third contrast component data (Y_high3(x, y)) are supplied to the CPU 9. Programs for controlling the DSP 6 are stored inside the DSP 6.

The gradation correction section 61 will be described. As shown in FIG. 2, the gradation correction section 61 serving as the gradation correction unit according to the invention includes a V-value conversion section 63, a V-value average calculation section 64, a first key determination section 65, a second key determination section 66, a third key determination section 67, a histogram creation section 68, a correction gain calculation section 69 and a gradation conversion section 70.

The V-value conversion section 63 is a section which converts the YUV-converted image data into HSV color space image data including three components, that is, a hue component, a saturation value component and a value component, and acquires a value of the value component (V-value). The V-value conversion section 63 supplies the acquired V-value (Vin) to the V-value average calculation section 64 and the histogram creation section 68.

Figure 3A:
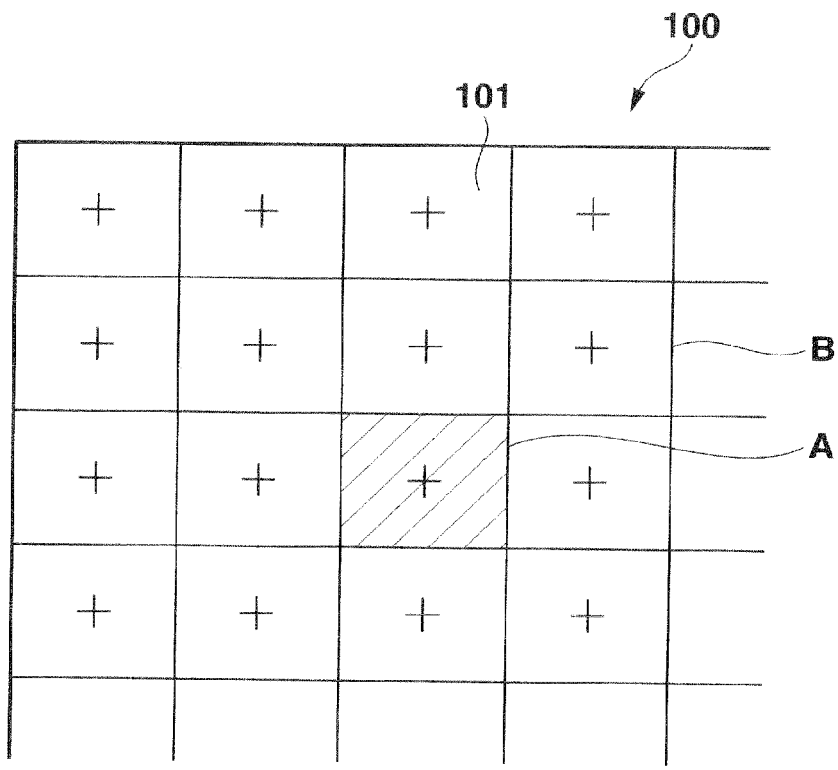
FIGS. 3A and 3B are schematic views showing block regions in an input image.
Figure 3B:
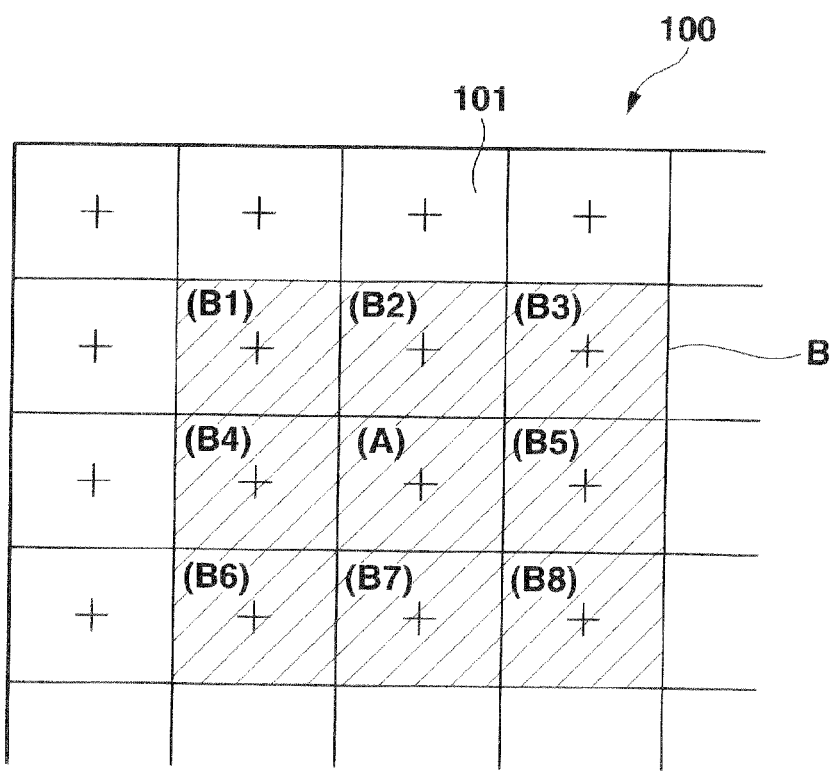

The V-value average calculation section 64 divides an input image into a plurality of predetermined block regions (divided regions). By setting each block region as a subject region, the V-value average calculation section 64 calculates an average value of V-values of all pixels (hereinafter referred to as "average V-value") in each of two kinds of key determination regions having different areas. FIGS. 3A and 3B are schematic views showing the block regions 101 in an input image 100. Regions hatched in FIGS. 3A and 3B are the key determination regions.

That is, as shown in FIG. 3A, the V-value average calculation section 64 sets a block region 101 (A in FIG. 3A), which is the subject region, itself as a first key determination region A, and calculates an average V-value of the first key determination region A. In addition, as shown in FIG. 3B, the V-value average calculation section 64 sets the block region 101 (A in FIG. 3A), which is the subject region, and the other eight adjacent block regions 101 (B1, B2, . . . B8 in FIG. 3B) around the subject region as a second key determination region (inclusive region) B and calculates an average V-value of the second key determination region B.

Based on the average V-value of the aforementioned first key determination region A calculated by the V-value average calculation section 64, the first key determination section 65 determines which brightness level (hereinafter referred to as "first brightness level") the brightness of the region A corresponds to among a plurality of predetermined brightness levels which are classified based on a brightness criterion (first brightness criterion). In the following description, the determination will be referred to as "first key determination". Here, the brightness level is determined to be one of three levels, i.e. "low", "middle" and "high". For example, the ranges of the average V-values corresponding to the respective brightness levels are three ranges into which the whole range (from "0" to "MAX") of the average V-values is equally divided. A first determination unit is constituted by the V-value average calculation section 64 and the first key determination section 65.

Based on the average V-value of the second key determination region B calculated by the V-value average calculation section 64, the second key determination section 66 determines which brightness level (hereinafter referred to as "second brightness level") the brightness of the region B corresponds to among a plurality of predetermined brightness levels which are classified based on a brightness criterion (second brightness criterion). In the following description, the determination will be referred to as "second key determination". Here, the brightness level is determined based on the same criterion as that in the first key determination. That is, the brightness level is determined to be one of "low", "middle" and "high". A second determination unit is constituted by the V-value average calculation section 64 and the second key determination section 66.

The third key determination section 67 determines which brightness level the brightness of the subject region corresponds to among brightness levels which are classified based on a brightness criterion (third brightness criterion) to be finer than those based on the aforementioned brightness criterion correspondingly to the combination of the results (first and second brightness levels) of the first and second key determinations. That is, the brightness level of the block region 101 which is the subject region is determined in consideration of the relative brightness relations between the subject region and the other eight adjacent block regions 101 (B1, B2, . . . B8) around the subject region. In the following description, the determination will be referred to as "third key determination".

In the embodiment, the brightness level is determined to be one of six levels "low 1", "low 2", "middle 1", "middle 2", "high 1" and "high 2" in the aforementioned third key determination. Of them, the "low 1" is the lowest level, and the "high 2" is the highest level. The correspondence relationship between the combination of the first and second brightness levels and the third brightness level is predetermined. FIG. 4 is a table showing the relationship.

The histogram creation section 68 counts the number of pixels for every V-value over the V-values (Vin) of all the pixels converted by the V-value conversion section 63, and outputs the counting result as histogram information showing the distribution condition of brightness of the whole input image to the correction gain calculation section 69.

The correction gain calculation section 69 serves as a calculation unit, a contrast determination unit and an upper limit adjustment unit according to the invention. Based on the result of the third key determination and the histogram information, the correction gain calculation section 69 uses a gain function (correction function) which will be described later to calculate a correction gain for use in gain adjustment to be performed for each pixel by the gradation conversion section 70. That is, the correction gain calculation section 69 calculates individual correction coefficients for gradation correction, by which pixel values of image data should be multiplied respectively. Then, the correction gain calculation section 69 sets the gradation coefficients in the gradation conversion section 70.

The gradation conversion section 70 serves as a regional correction unit according to the invention. The gradation conversion section 70 uses the gain calculated for each pixel by the correction gain calculation section 69 to adjust the luminance of the YUV data pixel by pixel. That is, the gradation conversion section 70 converts the luminance value (Y-value) of each pixel into a luminance value obtained by multiplication by the aforementioned gain.

Here, how the correction gain calculation section 69 calculates the correction gain will be described in detail. First the correction gain calculation section 69 sets a correction characteristic individually for each pixel. The correction characteristic is a characteristic of a gain variation with respect to a V-value variation in each pixel, which characteristic will be referred to for calculation of the gain. The correction characteristic can be obtained by a gain function which will be described later.

Specifically, of a plurality of kinds of correction characteristics predetermined respectively correspondingly to the six brightness levels (see FIG. 4) of "low 1", "low 2", "middle 1", "middle 2", "high 1" and "high 2", a correction characteristic corresponding to the third brightness level determined for each block region 101 in the third key determination is set as a representative correction characteristic for each central pixel of a plurality of block regions 101 (see FIGS. 3A and 3B).

For any other pixel than each central pixel, a new correction characteristic is obtained by linear interpolation from representative correction characteristics set for a plurality of central pixels adjacent to the pixel. The obtained correction characteristic is set for the pixel. The interpolation of the correction characteristic set for any other pixel than each central pixel is not limited to linear interpolation but may be performed by any other interpolation method such as spline interpolation.

Figure 5A:
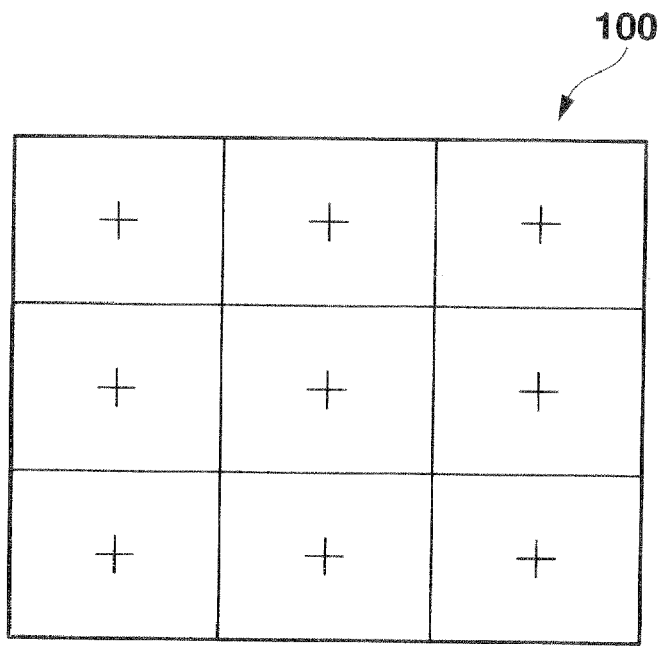
FIGS. 5A and 5B are a view showing block regions and their central pixels in an input image and a conceptual view showing the relationship between central pixels and other pixels at the time of interpolation of correction characteristics.
Figure 5B:
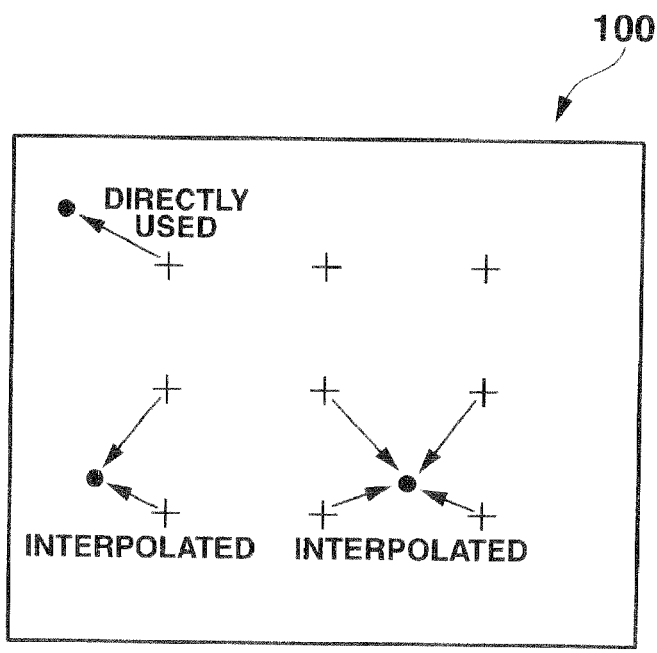

FIG. 5A is a view showing respective block regions obtained by dividing the photographed image (image to be processed) 100 into nine block regions and their central pixels ("+" in FIG. 5A). FIG. 5B is a view showing the relationship between each certain pixel ("·" in FIG. 5B) other than the central pixels and central pixels used for obtaining (interpolating) the correction characteristic of the certain pixel. As shown in FIG. 5B, for interpolation of the correction characteristic set for each pixel other than the central pixels, representative correction characteristics of up to four central pixels adjacent to the pixel are used. For each pixel in a block region located in an upper/lower and left/right corner of an input image, a representative correction characteristic set for a central pixel in the block region is set directly as the correction characteristic of the pixel.

Next, the representative correction characteristics and correction characteristics will be described in detail.

Here, the representative correction characteristics and the correction characteristics set for pixels respectively are characteristics which can be obtained by a basic gain function g(lev, x) shown in FIG. 6A. The correction gain calculation section 69 sets values of a gain level (lev) and an order (x), which are parameters (variables) defining the characteristic in the gain function as the representative correction characteristic or correction characteristic for each pixel.

FIGS. 6B and 6C are graphs each showing a characteristic of a variation of a gain (g) with respect to a variation of a V-value (Vin), which can be obtained by the aforementioned gain function. The gain (g) calculated by the gain function decreases with increase of the V-value (Vin), and reaches 1.0 time when "V-value=MAX". Differences in values of the parameters are reflected in the characteristic as follows.

That is, when the value of the order (x) is the same as shown in FIG. 6B, the gain (g) as a whole increases with increase of the gain level (lev), and the maximum value of the gain (g) is 2.0 times when "lev=2". On the other hand, when the value of the gain level (lev) is the same as shown in FIG. 6C, the gain (g) of a middle brightness region particularly close to highlight (with a maximum V-value) is suppressed with increase of the order (x). The gain (g) on the highlight side (with a larger V-value) may be 1.0 or lower in some values.

That is, when a gain to be set in the gradation conversion section 70 is calculated for each pixel by use of the aforementioned gain function, the gradation of a dark portion in an input image can be enhanced if the gain level (lev) is increased to increase the gain as a whole. At the same time, if the order (x) is increased to set the gain on the highlight side (with a maximum V-value) at 1.0 or lower, it is possible to reduce whiteout in a bright portion of the input image.

Thus, though not shown, values decreasing with increase in brightness level are set in gain levels (lev) corresponding to the aforementioned six brightness levels ("low 1", ... "high 2") respectively, while values increasing with increase in brightness level are set in orders (x) corresponding to the brightness levels respectively. The values of the two parameters (lev, x) are predetermined ones based on the empirical rule.

In addition, the correction gain calculation section 69 calculates the gain not directly by use of the aforementioned gain function but by use of a gain function written in the following expression (1), which is also shown in FIG. 7A.

$$glim(lev,x)=\min\{g(lev,x),(lev-1.0)\times lim+10\} \quad (1)$$

The parameter (lim) in the gain function is a gain limiting coefficient which defines the upper limit of the gain. When the parameter is set at 1.0 or lower, the upper limit of the gain can be adjusted in accordance with the value of the gain level (levl). The value of the gain limiting coefficient is set to be constant in the whole image (in all the pixels). In the following description, the aforementioned gain function will be referred to as a gain-limited gain function expediently.

FIG. 7B is a graph showing a characteristic of a variation of a gain with respect to a variation of a V-value in each pixel when "lim=1". In this case, the characteristic is similar to that in the case where the gain is not limited. FIG. 7C is a graph showing a characteristic of a variation of a gain with respect to a variation of a V-value in each pixel when "lim=0.5". When the gain limiting coefficient is set at 1.0 or lower, the gain in a pixel with a larger V-value can be suppressed with decrease of the value of the gain level (lev). That is, by suppressing the gain in pixels of dark portions, the contrast of the image (fineness of the dark portions) can be emphasized.

In addition, the value of the gain limiting coefficient (lim) is set in accordance with the contrast of the image. In the embodiment, contrast determination is performed to determine (estimate) the contrast condition of the image based on the result of the aforementioned third key determination. A value is set in accordance with the result of the contrast determination.

Specifically, the number of block regions whose brightness levels were the lowest level "low 1" in the third key determination and the number of block regions whose brightness levels were the highest level "high 2" likewise are counted individually. For each brightness level, it is checked whether the counted number is not smaller than or smaller than a threshold (N, M) set for the level. As shown in FIGS. 7A-7C, the contrast condition is determined from the combination of the number of "low 1" block regions (not smaller than N, or smaller than N) and the number of "high 2" block regions (not smaller than M, or smaller than M), and the gain limiting coefficient is set in accordance with the result of the determination.

FIGS. 7A-7C show an example where the contrast condition is classified into four levels. For example, when the number of "low 1" block regions is not smaller than the threshold N and the number of "high 2" block regions is not smaller than M, it is concluded that the contrast of the image is the highest, and the value of the gain limiting coefficient is set at "1.0". That is, the contrast emphasis is prevented substantially. On the other hand, when the number of "low 1" block regions is smaller than the threshold N and the number of "high 2" block regions is smaller than M, it is concluded that the contrast of the image is the lowest, and the value of the gain limiting coefficient is set at "0.5".

When the upper limit of the gain for each pixel is adjusted by use of the aforementioned gain-limited gain function, the contrast (fineness of the dark portions) of the image can be emphasized. Even in that case, if the value of the order (x) set for each pixel in gain calculation is large in some degree, the gain (g) on the highlight side (high V-value side) excluding a highlight portion (pixel portion whose V-value is the highest) will be not higher than 1.0, as shown in FIG. 6C. That is, negative correction will be applied to pixel values of bright portions in the image.

This leads to unnecessary lowering of contrast in an image where gradation is poor in bright portions. In addition, in an image where whiteout is conspicuous (or there are many whiteout portions), tone jump is caused to increase a difference in gradation between a whiteout portion and a portion circumferential to the whiteout portion where nearly be whiteout (or whose V-value is near the maximum value).

In the correction gain calculation section 69, therefore, when the gain is calculated for each pixel, it is determined whether the input image is an image where negative correction of a pixel value of a bright-portion pixel will be inappropriate or not, that is, an image whose gradation is poor in a bright portion, or whether the input image is an image which has a large whiteout area or not (this determination will be referred to as "highlight determination"). When it is concluded that the input image is an image where negative correction will be inappropriate, the gain is calculated by a gain function written in the following expression (2), which is also shown in FIG. 9A.

$$gclip(lev,x)=\max\{glim(lev,x),1.0\} \quad (2)$$

That is, when the lower limit of the gain is clipped (limited) to "1.0", unnecessary deterioration of contrast when the input image is an image whose gradation is poor in bright portions, and occurrence of tone jump when the input image is an image which has a large whiteout area can be avoided. In the following description, the gain function will be referred to as a clipped gain function expediently.

FIGS. 9B and 9C are graphs showing a difference between the gain variation characteristic in the case where the clipping is performed and that in the case where the clipping is not performed when the value of the gain limiting coefficient (lim) is set at "1.0". FIG. 9B shows the variation characteristic when the clipping is not performed, and FIG. 9C shows the variation characteristic when the clipping is performed.

The highlight determination is performed as follows based on the histogram information (distribution condition of brightness based on the number of pixels for each V-value over the whole image) obtained by the histogram creation section 68. That is, as shown in FIG. 10A, when the number of pixels whose gradation values are larger than a gradation value X located in a gradation position which is several percent (e.g. 5-10%) lower than the maximum gradation value (maximum V-value) is not larger than a predetermined fixed number, it is concluded that the input image is an image whose gradation is so poor in a bright portion that negative correction will be inappropriate. As shown in FIG. 10C, when the number of pixels having the maximum gradation value (maximum V-value) is not smaller than the predetermined fixed number, it is concluded that the input image is an image whose whiteout area is so large that negative correction will be inappropriate. As shown in FIG. 10B, when the number of pixels whose gradation values are larger than the gradation value X is larger than the predetermined fixed number and the number of pixels having the maximum gradation value (maximum V-value) is smaller than the predetermined fixed number, that is, when the input image does not satisfy the two determination conditions, it is concluded that the input image is an image whose gradation is so rich in a bright portion that negative correction will be appropriate.

Here, the histogram information for use in the aforementioned highlight determination shows the distribution condition of brightness based on the number of pixels for each V-value. Therefore, also when the input image is an image where color saturation occurs in a large area, it can be concluded that the input image is an image where negative correction will be inappropriate, in the same manner as when it is an image which has a large whiteout area. Thus, in addition to tone jump near a portion where whiteout occurs, tone jump near a portion where color saturation occurs can be avoided simultaneously.

As described above, the correction gain calculation section 69 calculates the gain for each pixel in accordance with the result of the aforementioned highlight determination. That is, when the input image is an image whose gain has to be clipped, the correction gain calculation section 69 calculates the gain for each pixel by use of the clipped gain function gclip(lev, x) and sets the gain as a correction gain in the gradation conversion section 70. When the input image is an image whose gain does not have to be clipped, the correction gain calculation section 69 calculates the gain for each pixel by use of the basic gain function glim(lev, x) and sets the gain as a correction gain in the gradation conversion section 70.

In the gradation conversion section 70, the luminance value of the YUV data is adjusted pixel by pixel with the gain calculated in accordance with the result of the highlight determination by the correction gain calculation section 69. That is, the input luminance value (Yin) of each pixel is converted into a luminance value Yout, which can be obtained by one of the following expressions (3) and (4).

$$Yout=Yin \times glim(lev,x) \quad (3)$$

$$Yout=Yin \times gclip(lev,x) \quad (4)$$

That is, the luminance level (brightness) of each pixel in the input image is converted individually in accordance with a correction characteristic set for the pixel so as to correct the gradation of the photographed image. Corrected image data (drc(x, y)) are supplied to the CPU 9.

Figure 11:
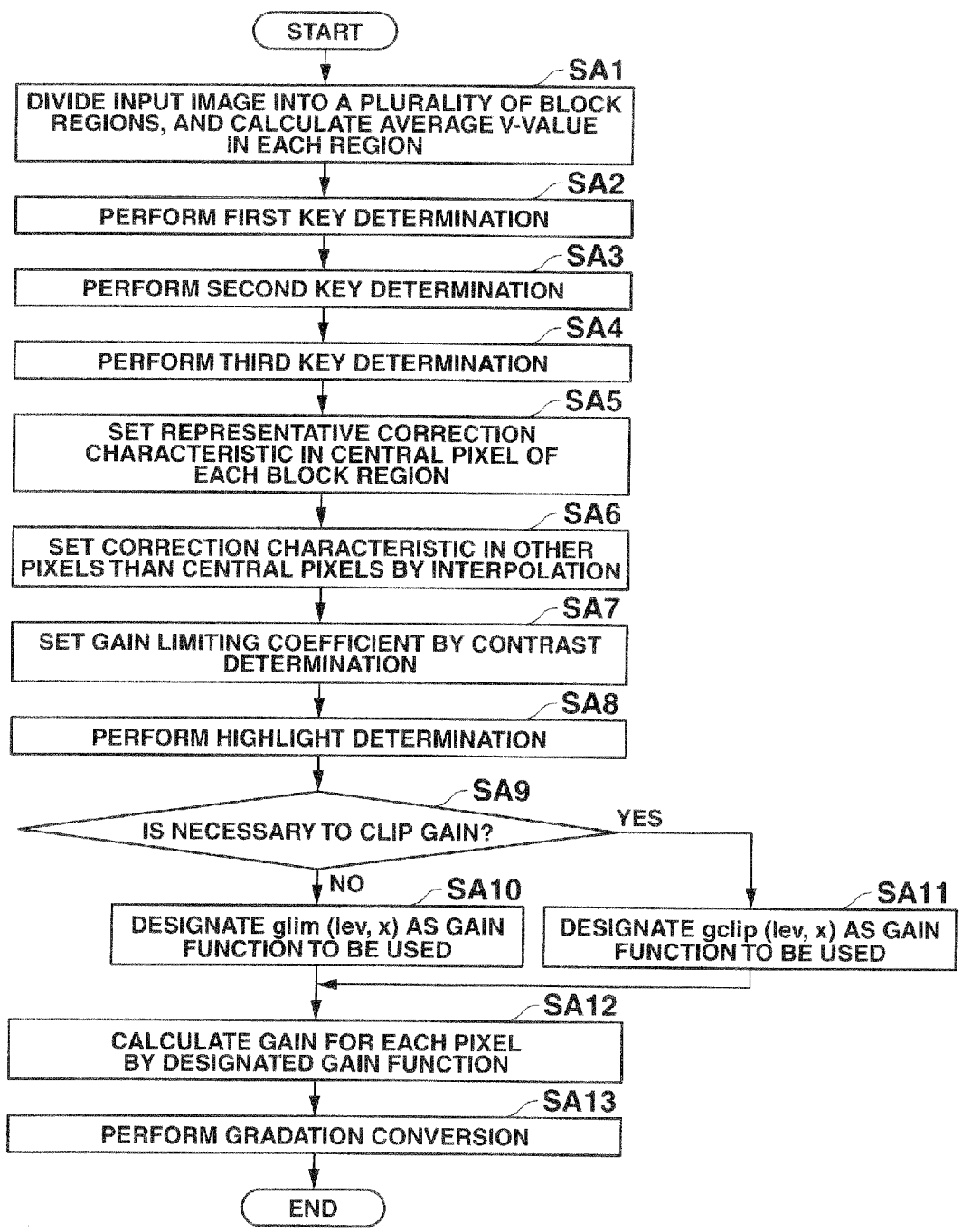
FIG. 11 is a flow chart showing the details of signal processing performed in a still image pickup mode by a gradation correction section of the DSP.

FIG. 11 is a flow chart showing the details of signal processing in the gradation correction section 61. Each step shown in the flow chart of FIG. 11 is executed by the DSP 6 in cooperation with programs stored in the DSP 6. Step SA1 shown in FIG. 11 is processed by the V-value average calculation section 64, Steps SA2 to SA4 are processed by the first key determination section 65, the second key determination section 66 and the third key determination section 67, and Steps SA5 to SA12 are processed by the correction gain calculation section 69. In fact, processing of Steps SA12 and SA13 is repeated a number of times corresponding to the number of pixels. Details of each step have been described above, but will not be described redundantly.

Here, as described above, in the gradation correction section 61, the brightness level of each block region 101 which will be referred to for determination of the correction characteristic at the time of calculation of the gain for each pixel is determined in consideration of the relative brightness relation to surrounding block regions, and the brightness of each pixel is corrected based on the determined brightness level. As a result, more appropriate gradation correction where features of each portion in the image are reflected accurately can be performed. Thus, it is possible to generate image data (corrected image) where the contrast balance is maintained in each local portion (near a border between a bright portion and a dark portion) of the image.

When the gain for each pixel is calculated, the contrast determination is performed on the photographed image, and the upper limit of the gain set for each pixel is adjusted in accordance with the result of the determination. As described previously, it is therefore possible to suppress the gain with respect to pixels of dark portions. As a result, it is possible to obtain an image where the contrast of dark portions (fineness of dark portions) of the image is emphasized.

Further, when the gain for each pixel is calculated, the highlight determination is performed on the photographed image. Based on the highlight determination, it is determined whether the image is an image inappropriate for negative correction of pixel values of pixels in bright portions or not. When the image is an image inappropriate for negative correction, the lower limit of the gain set for each pixel is clipped (limited) to 1.0. Thus, it is possible to prevent unnecessary deterioration of contrast when the input image is an image whose gradation is poor in bright portions, occurrence of tone jump when the input image is an image which has a large whiteout area, or occurrence of tone jump around a portion where color saturation occurs.

Next, the adjusted data generation section 62 will be described. The adjusted data generation section 62 serves as a gradation information acquisition unit according to the invention. As shown in FIG. 2, the adjusted data generation section 62 includes a luminance data extraction portion 71, a first filter processing portion 72, a second filter processing portion 73 and a luminance subtraction processing portion 74. Details of the respective portions will be described below with reference to the flow chart of FIG. 12 which shows details of signal processing in the adjusted data generation section 62. Each step shown in the flow chart of FIG. 12 is executed by the DSP 6 in cooperation with programs stored in the DSP 6.

Figure 12:
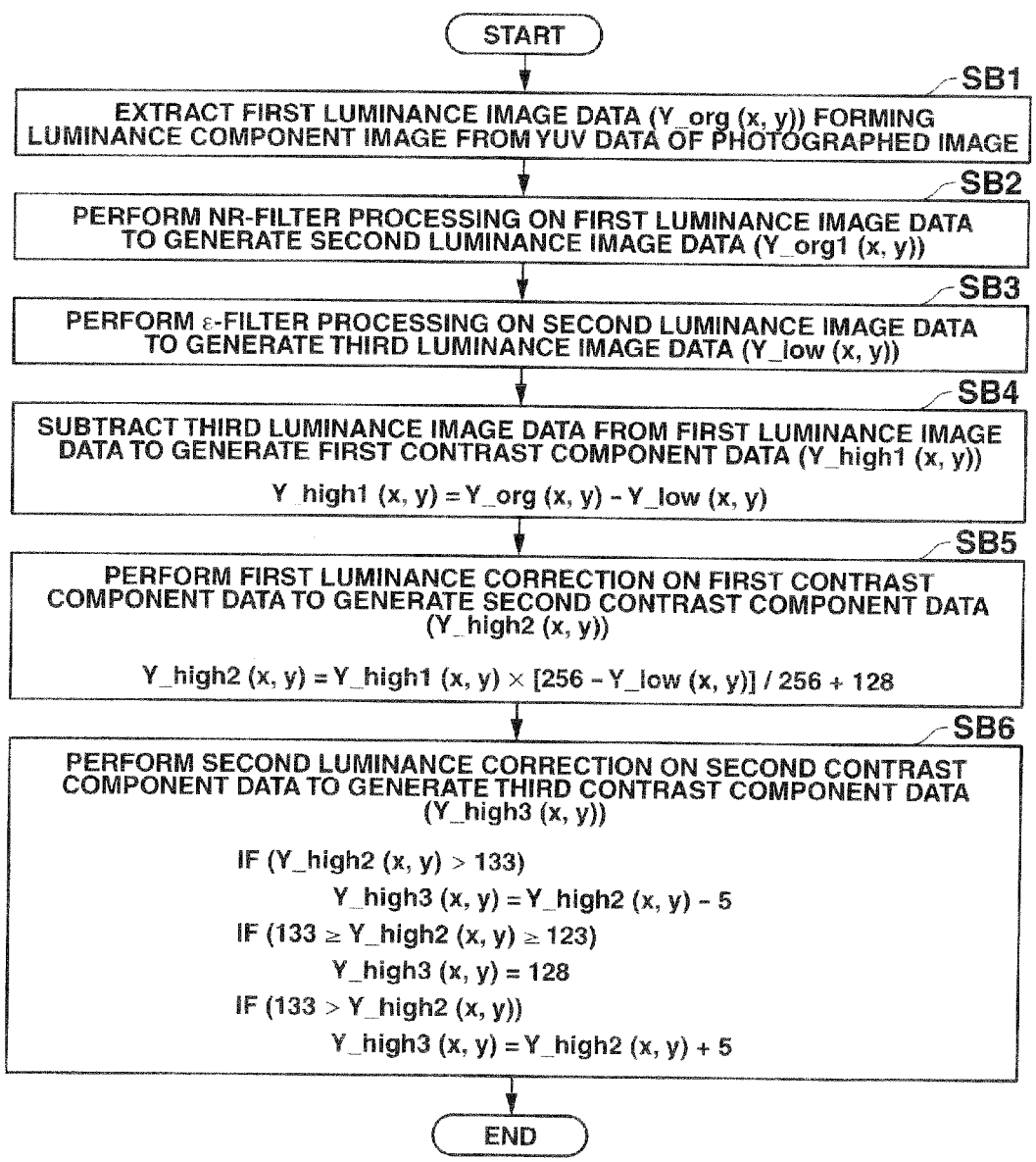
FIG. 12 is a flow chart showing the details of the signal processing performed in the still image pickup mode by an adjusted data generation section of the DSP.

The luminance data extraction portion 71 extracts first luminance image data (Y_org(x, y)) forming a luminance component image including only a luminance component, from YUV data of a photographed image (image to be processed), and supplies the first luminance image data to the first filter processing portion 72 (Step SB1 in FIG. 12).

The first filter processing portion 72 performs filter processing using an NR filter such as a median filter for eliminating noise from the luminance component image, generates second luminance image data (Y_org1(x, y)) forming a noise-eliminated luminance component image, and supplies the second luminance image data to the second filter processing portion 73 (Step SB2 in FIG. 12). The noise elimination with the NR filter is performed intensely.

The second filter processing portion 73 serves as a global luminance image generation unit according to the invention. The second filter processing portion 73 applies smoothing processing using an ϵ-filter upon each pixel of the second luminance image data, generates third luminance image data (Y_low(x, y)) forming a global luminance image and supplies the third luminance image data to the luminance subtraction processing portion 74 (Step SB3 in FIG. 12). The global luminance image is an image where each portion is greatly blurred while edges are maintained. The global luminance image shows the global brightness condition of each portion of the original image.

In the embodiment, in ϵ-filter processing for each subject pixel, attention is paid to a pixel region including three-by-three pixels (pixel region of a total of 9 pixels around the subject pixel) in the second luminance image data. That is, attention is paid to the subject pixel and 8 peripheral pixels located around the subject pixel. The luminance value of each peripheral pixel is adjusted so that a differential value between the luminance value of the subject pixel and the luminance value of the peripheral pixel will be not higher than a threshold T (T=20). The original luminance value of the subject pixel and the adjusted luminance values of the peripheral pixels are multiplied respectively by ⅑ as a predetermined coefficient. The sum of the luminance values thus obtained is calculated. The luminance value obtained by this calculation is set as a luminance value of the subject pixel subjected to the ϵ-filter processing (each pixel in the third luminance image data). In the ϵ-filter processing, the range of the pixel region to which attention is paid, the value of the threshold T and the coefficient by which the luminance value of each pixel is multiplied may be changed suitably.

The luminance subtraction processing portion 74 generates first contrast component data (Y_high1(x, y)) based on the following expression (5) and supplies the first contrast component data to a first luminance correction section 75 (Step SB4 in FIG. 12).

$$Y\_high1(x,y) = Y\_org(z,y) - Y\_low(x,y) \quad (5)$$

The first contrast component data are obtained by subtracting, from the pixel value of each pixel in the first luminance pixel data, the pixel value of a corresponding pixel in the third luminance image data. A high-frequency component contained in the photographed image is reflected in the first contrast component data.

The first luminance correction section 75 performs first luminance correction upon the first contrast component data based on the following expression (6).

$$Y\_high2(x,y) = Y\_high1(x,y) \times [256 - Y\_low(x,y)]/256 + 128 \quad (6)$$

That is, the first contrast component data are multiplied by a correction coefficient varying in inverse proportion to the magnitude of the luminance value of each pixel. Then, an intermediate luminance value (128) in an effective luminance range which is effective as image data is added uniformly to the luminance value of each pixel.

That is, the luminance values of all the pixels in the first contrast component data are increased by 198. Thus, for each pixel whose luminance value is lower than a minimum luminance (luminance value=0) effective as image data, the luminance value of the pixel which will be effective when the contrast balance of image data (photographed image) whose gradation is corrected by the gradation correction section 61 is adjusted is shifted into an effective luminance range (0-255). Thus, correction is performed to prevent information about a high-frequency component in a dark portion of the photographed image from being absent. At the same time, correction is performed so that the luminance value of each pixel whose original luminance value is within the effective luminance range and higher than the luminance value (128) corresponding to the increase is reduced more greatly as the original luminance value is higher. Corrected second contrast component data (Y_high2(x, y)) thus obtained are supplied to the second luminance correction section 76 (Step SB5 in FIG. 12).

In the embodiment, the first filter processing portion 72, the second filter processing portion 73, the luminance subtraction processing portion 74 and the first luminance correction section 75 serve as an information image generation unit according to the invention.

A second luminance correction section 76 serves as a gradation information correction unit according to the invention. The second luminance correction section 76 performs second luminance correction on the second contrast component data (Step SB6 in FIG. 12). That is, of the second contrast component data, the luminance value of each pixel whose luminance value is in a range of from a first threshold (123) to a second threshold (133), that is, in an intermediate range of the effective luminance range, is converted into an intermediate luminance value (128) of the effective luminance range. A predetermined correction value (5) is added uniformly to each pixel value that is lower than the first threshold (123) while the predetermined correction value (5) is subtracted uniformly from each pixel value that is higher than the second threshold (133).

That is, correction is performed to reduce noise contained in the second contrast component data and contained in each pixel value which is in the intermediate range of to the effective luminance range. At the same time, correction is performed to cancel the discontinuity of pixel values appearing between the lower luminance value side and the higher luminance value side with respect to the intermediate range due to the noise reduction correction. Corrected third contrast component data (Y_high3(x, y)) thus obtained are supplied to the CPU 9.

Figure 13:
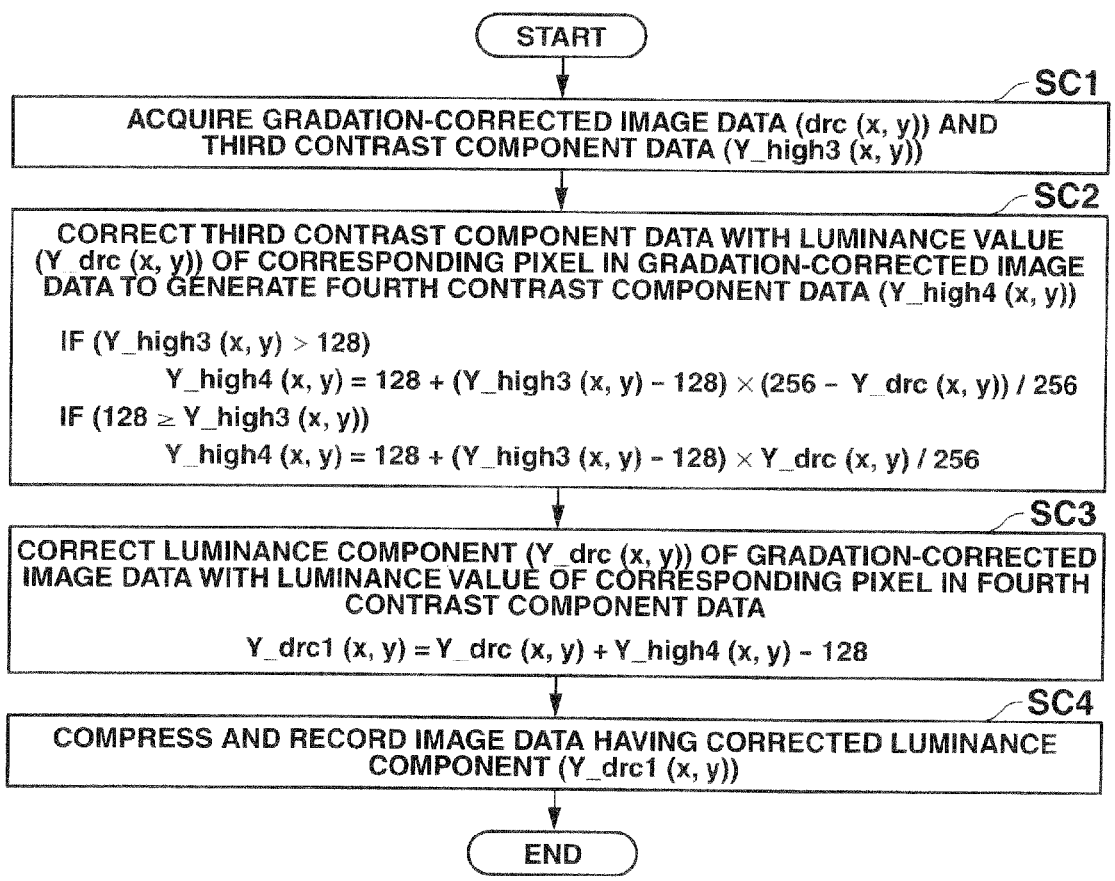
FIG. 13 is a flow chart showing the procedure of processing performed in the still image pickup mode by a CPU.

FIG. 13 is a flow chart showing processing according to the invention, which is performed by the CPU 9 in a still image pickup mode.

When a user pushes the shutter key in a recording mode, the CPU 9 controls the CCD 2 and allows the DSP 6 to perform the aforementioned processing. Thus, the CPU 9 immediately acquires the gradation-corrected image data (drc(x, y)) generated by the gradation correction section 61 and the third contrast component data (Y_high3(x, y)) generated by the adjusted data generation section 62 (Step SC1).

Next, the CPU 9 performs third luminance correction which will be described upon the third contrast component data to generate fourth contrast component data (Y_high4(x, y)) (Step SC2). In the third luminance correction, luminance values of pixels in the third contrast component data are classified into a bright region including pixels with their luminance values higher than the intermediate luminance value (128) of the effective luminance range and a dark region including pixels with their luminance values not higher than the intermediate luminance value (128), and the following correction is performed.

For the luminance value of each pixel in the bright region, the luminance value of each pixel in the third contrast component data is corrected based on the following expression (7).

$$Y\_high4(x,y)=128+[Y\_high3(x,y)-128]\times[256-Y\_drc(x,y)]/256 \quad (7)$$

That is, the intermediate luminance value added in the aforementioned first luminance correction (see Step SB5 in FIG. 12) during the process of generating the third contrast component data is subtracted from the luminance value of each pixel in the bright region. The luminance value thus obtained is multiplied by a correction coefficient varying in inverse proportion to the magnitude of the luminance value of a corresponding pixel of the gradation-corrected image data. Then the intermediate luminance value (128) is added uniformly to the product of the luminance value thus obtained. That is, correction is performed so that the original luminance value of each pixel is made lower as the luminance value of a corresponding pixel of the gradation-corrected image data is higher. In other words, correction is performed on the third contrast component data so that the luminance value to be added to the luminance value of each pixel in the bright region of the gradation-corrected image data (corrected image) is made in inverse proportion to the original luminance value of the corresponding pixel of the corrected image.

On the other hand, for the luminance value of each pixel in the dark region the luminance value of each pixel in the third contrast component data is corrected based on the following expression (8).

$$Y\_high4(x,y)=128+[Y\_high3(x,y)-128]\times[Y\_drc(x,y)]/256 \quad (8)$$

That is, the intermediate luminance value added in the aforementioned first luminance correction (see Step SB5 in FIG. 12) during the process of generating the third contrast component data is subtracted from the luminance value of each pixel in the dark region. The luminance value thus obtained is multiplied by a correction coefficient varying in proportion to the magnitude of the luminance value of a corresponding pixel of the gradation-corrected image data. Then, the intermediate luminance value (128) is added uniformly to the product of the luminance value thus obtained. That is, correction is performed so that the original luminance value of each pixel is made lower as the luminance value of a corresponding pixel of the gradation-corrected image data is lower. In other words, correction is performed on the third contrast component data so that the luminance value to be added to the luminance value of each pixel in the dark region of the gradation-corrected image data (corrected image) is made in proportion to the original luminance value of the corresponding pixel of the corrected image.

After that, the CPU 9 corrects the luminance component (Y_drc(x, y)) of each pixel in the graduation-corrected image data with the luminance value of a corresponding pixel in the fourth contrast component data thus obtained. That is, processing is performed based on the following expression (9).

$$Y\_drc1(x,y)=Y\_drc(x,y)+Y\_high4(x,y)-128 \quad (9)$$

That is, to the luminance value of each pixel in the graduation-corrected image data, the luminance value of a corresponding pixel in the fourth contrast component data (Y_high4(x, y)) is added. Then, the intermediate luminance value (128) is subtracted uniformly to the sum of the luminance value thus obtained. Thus, new image data having a corrected luminance component (Y_drc1(x, y)) are generated (Step SC3). That is, a high-frequency component contained in an original photographed image before gradation correction is reflected in the photographed image (corrected image) on which the gradation correction has been performed in the gradation correction section 61. Thus, brightness adjustment is performed to adjust the brightness of the corrected image pixel by pixel.

Then the generated image data are compressed, and recorded as a photographed image on the external memory 10 (Step SC4).

In this manner, when a still image is taken, more suitable gradation correction for accurately reflecting features of respective parts in a photographed image can be performed on the image by the gradation correction section 61 as described previously. Thus, it is possible to obtain image data (corrected image) where the contrast balance is maintained in each local region (near a border between a bright portion and a dark portion) of the image.

In addition, in the gradation correction, the luminance level of a low luminance level region is raised to inevitably reduce the difference (contrast) in luminance level between the low luminance level region and a high luminance level region in the whole image. However, as described previously, a high-frequency component contained in the original photographed image which has not been subjected to gradation correction is finally reflected in the photographed image (corrected image) which has been subjected to the gradation correction. Thus, it is possible to compensate the contrast of the whole image which has been lost due to the gradation correction.

Figure 14A:
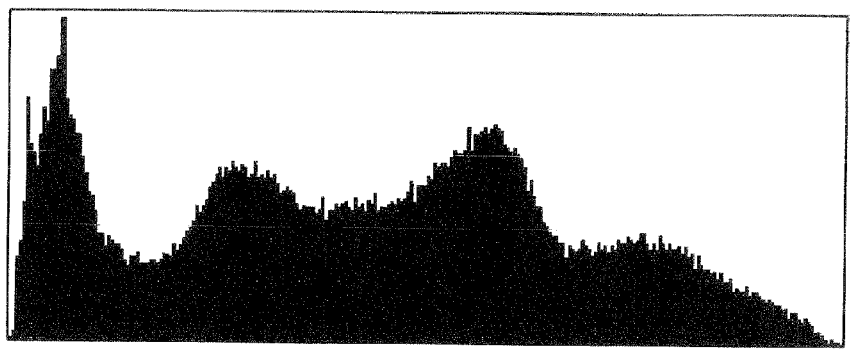
FIGS. 14A-14C are histograms showing luminance of a photographed image in each stage by way of example.
Figure 14B:
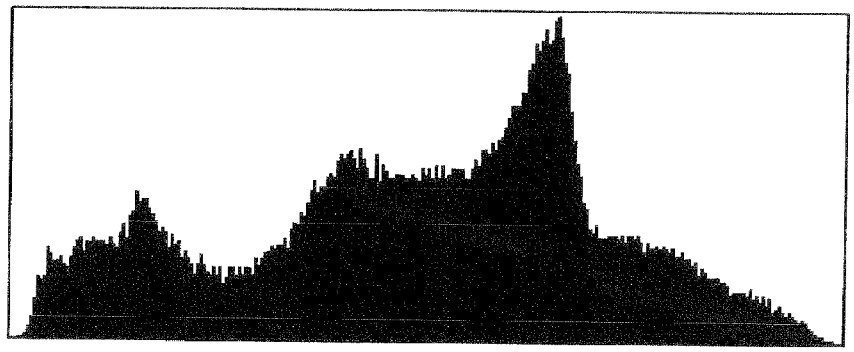
Figure 14C:
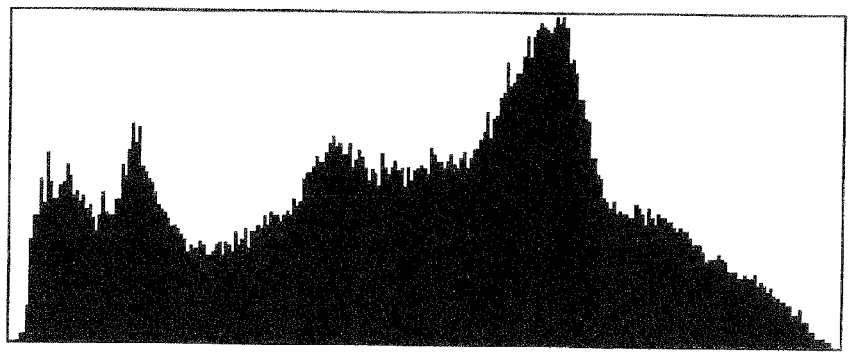

FIGS. 14A-14C are luminance histograms by way of example. FIG. 14A is a luminance histogram of a photographed image before gradation correction. FIG. 14B is a luminance histogram of the photographed image after the gradation correction. FIG. 14C is a luminance histogram of the photographed image after brightness adjustment As shown in FIGS. 14A-14C, since a high-frequency component contained in the original photographed image before gradation correction is reflected, it is possible to obtain a high-quality image as a final photographed image, in which gradation correction is performed so that features of respective parts in the image are reflected accurately, while the relative brightness balance in each portion is close to the original one.

In addition, in the embodiment, the adjusted data generation section 62 (second filter processing portion 73) of the DSP 6 uses an ε-filter to generate third luminance image data (Y_low(x, y)) forming a global luminance image from second luminance image data (Y_org1(x, y)) forming a noise-eliminated luminance component image. Thus, a high-frequency component (contrast information) contained in the original photographed image can be accurately reflected in image data finally generated as a photographed image. The reason will be described below.

That is, the third luminance image data may be, for example, generated by use of a normal LPF (Low Pass Filter) to smooth the noise-eliminated luminance component image. In that case, the border between a bright region and a dark region is blurred in a global luminance image (third luminance image data) that is generated by normal LPF processing (smoothing processing). That is, the bright region side near the border between the bright region and the dark region in the original image (image to be processed) becomes darker (with a lower luminance value), and the dark region side becomes brighter (with a higher luminance value).

Figure 17A:
FIGS. 17A and 17B are views showing examples of images including first contrast component data expediently.

Thus, in the first contrast component data (Y_high1(x, y)) obtained by subtracting, from the pixel value of each pixel in the luminance component image (first luminance image data), the pixel value of a corresponding pixel in the global luminance image (third luminance image data), the luminance value of each pixel on the bright region side near the border between a bright region and a dark region becomes higher than the luminance value of each pixel in an independent bright region (such as a background sky) (because the luminance value of the pixel on the bright region side near the border between the bright region and the dark region in the LPF-processed image, which luminance value is subtracted from the luminance value in the original image, is lower as described above). As a result, the luminance value of each pixel only near the border between the bright region and the dark region becomes higher. That is, the luminance image composed of the first contrast component data looks as if a white "belt" appeared on the bright region side near the border between the bright region and the dark region. FIG. 17A is a view showing the image composed of the first contrast component data in this manner, and the white "belt". The white "belt" is illustrated for the sake of convenience, and the width and appearance thereof are different from real ones.

In addition, the luminance value of each pixel on the dark region side near the border between the bright region and the dark region becomes lower than the luminance value of each pixel in an independent dark region (such as a human subject against the sun) (because the luminance value of the pixel on the dark region side near the border between the bright region and the dark region in the LPF-processed image, which luminance value is subtracted from the luminance value in the original image, is higher as described above). As a result, the luminance value of each pixel only near the border between the bright region and the dark region becomes lower. That is, the luminance image composed of the first contrast component data looks as if a black "belt" appeared on the dark region side near the border between the bright region and the dark region (not shown).

Accordingly, when the noise-eliminated luminance component image includes a portion having a very large difference between a bright region and a dark region, a high-frequency component contained in the original photographed image cannot be accurately reflected in finally generated image data if the first contrast component data are generated by subtraction processing based on normal LPF processing.

On the other hand, the $\epsilon$-filter is a smoothing filter having edge preserving properties. As described above, in the $\epsilon$-filter processing, when there is a large differential value between the luminance value of a subject pixel and the luminance value of each peripheral pixel around the subject pixel, the luminance value of each peripheral pixel is adjusted so that the differential value therebetween becomes not higher than a threshold of 20.

Figure 15A:
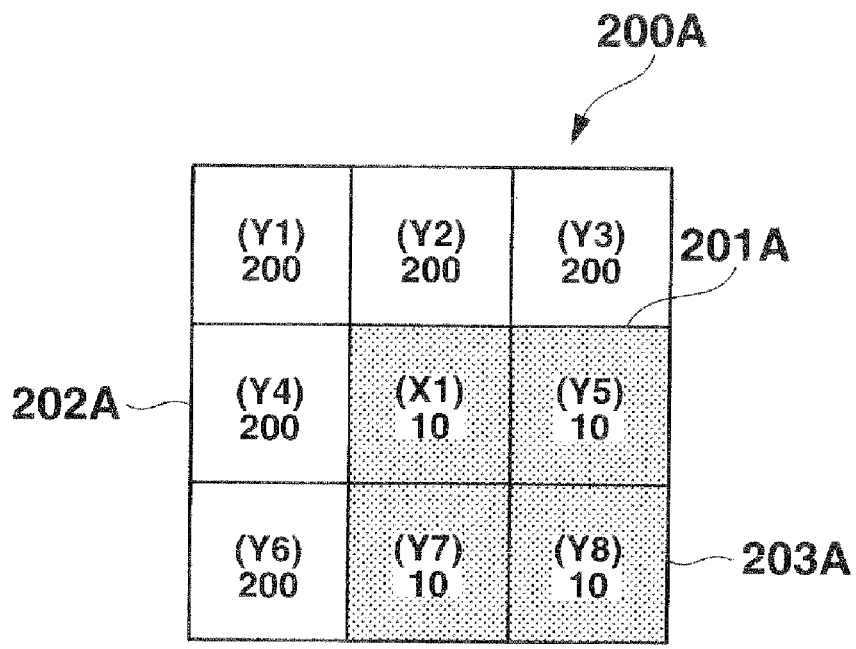
FIGS. 15A and 15B are views showing a pixel region to which attention is paid in ϵ-filter processing and a view showing that the luminance value of each peripheral pixel is adjusted in the ϵ-filter processing.
Figure 15B:
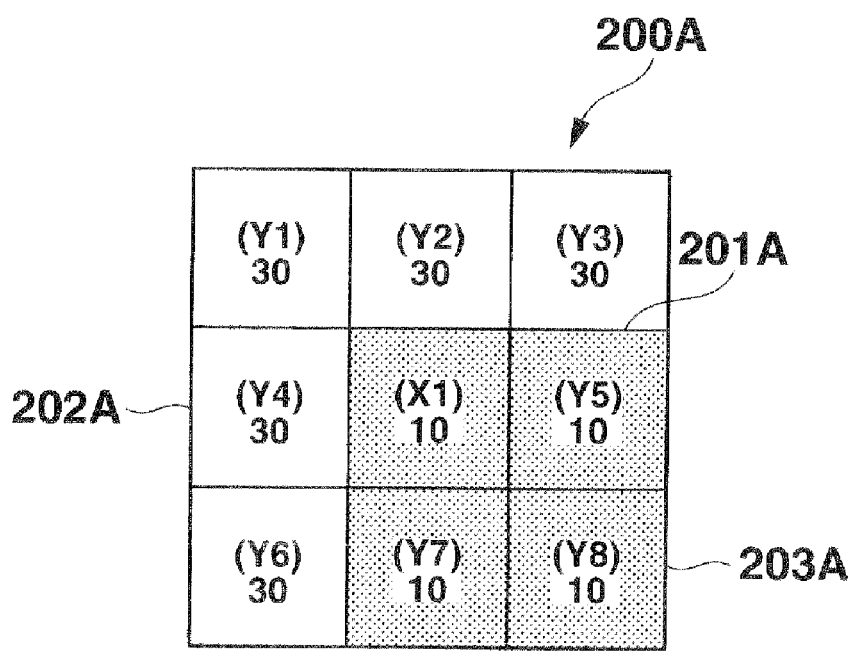

Here, description will be made in the case where attention is paid to a region 200A including 9 pixels X1, Y1, Y2, . . . and Y8 in the second luminance image data as shown in FIG. 15A, and $\epsilon$-filter processing is performed on the subject pixel X1 located in a dark region 203A (gray region) near a border 201A (thick solid line) serving as an edge between a bright region and a dark region, so as to smoothen the subject pixel X1. In this case, a luminance value difference (190) between the luminance value (200) of each peripheral pixel Y1, Y2, Y3, Y4, Y6 in a bright region 202A (colorless region) and the luminance value (10) of the subject pixel X1 located in the dark region 203A is not lower than the threshold of 20. Accordingly, as shown in FIG. 15B, the luminance value (200) of each peripheral pixel in the bright region 202A is adjusted to 30, which is equal to the sum of the luminance value (10) of the subject pixel X1 and the threshold of 20, so as to make the luminance value difference not higher than the threshold. As a result, the luminance value of each peripheral pixel in the bright region 202A is smaller than the original luminance value (200) and close to the original luminance value (10) of the subject pixel. In the embodiment, as described above, the value of the subject pixel subjected to the $\epsilon$-filter processing is the sum of luminance values obtained by multiplying the original luminance value of the subject pixel and the adjusted luminance values of the peripheral pixels respectively by ⅑ as a predetermined coefficient.

Thus, the luminance value of the subject pixel subjected to the $\epsilon$-filter processing is obtained to be 21 by rounding the calculation result of (30+30+30+30+10+10+30+10+10)/9, which is close to the original luminance value (10) of the subject pixel. Thus, when the $\epsilon$-filter processing is performed on the subject pixel X1 located in the dark region 203A on the border 201A (edge) between a bright region and a dark region so as to smooth the subject pixel X1, the influence of the peripheral pixels in the bright region 202A can be reduced.

Figure 16A:
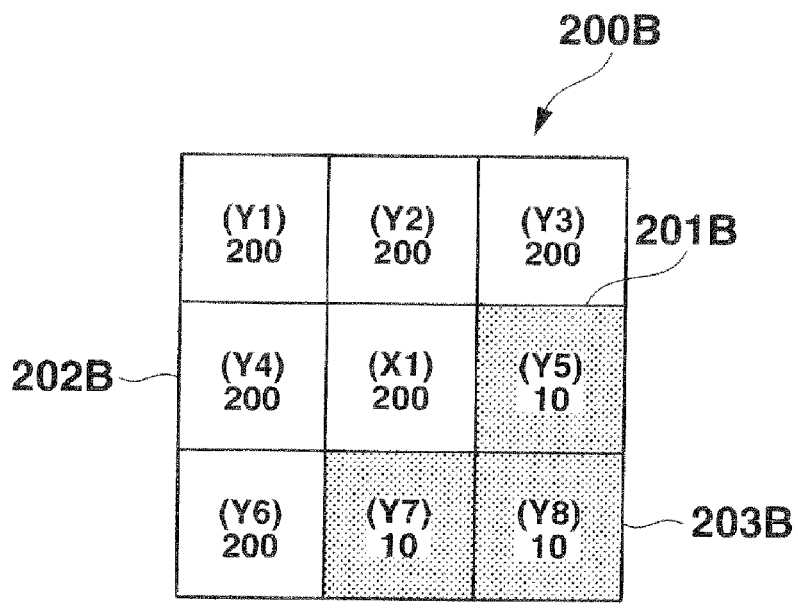
FIGS. 16A and 16B are views showing a pixel region to which attention is paid in ϵ-filter processing and a view showing that the luminance value of each peripheral pixel is adjusted in the ϵ-filter processing.
Figure 16B:
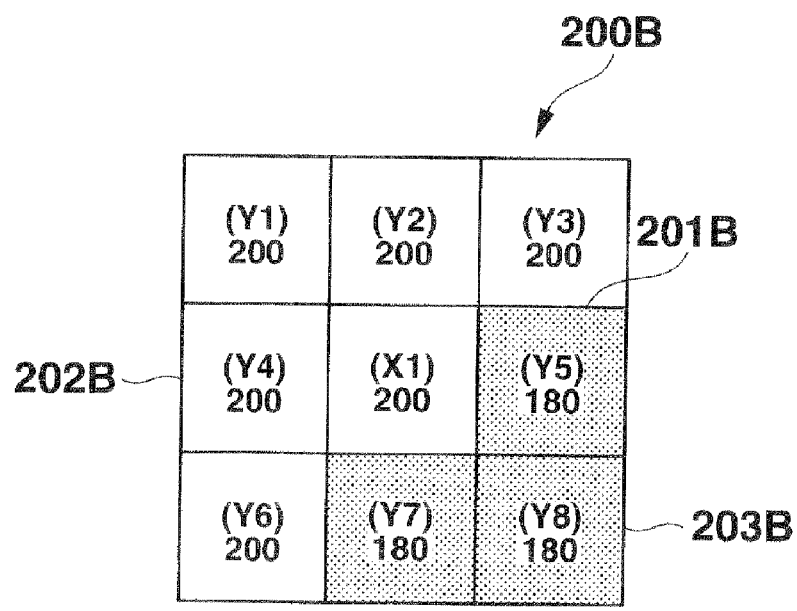

Similarly, description will be made in the case where attention is paid to a region 200B including 9 pixels X1, Y1, Y2, . . . and Y8 in the second luminance image data as shown in FIG. 16A, and $\epsilon$-filter processing is performed on the subject pixel X1 located in a bright region 202B (colorless region) near a border 201B (thick solid line) serving as an edge between a bright region and a dark region so as to smooth the subject pixel X1. In this case, a luminance value difference (190) between the luminance value (10) of each peripheral pixel Y5, Y7, Y8 in a dark region 203B (gray region) and the luminance value (200) of the subject pixel X1 located in the bright region 202B is not lower than the threshold of 20. Accordingly, as shown in FIG. 16B, the luminance value (10) of each peripheral pixel in the dark region 203B is adjusted to 180, which is equal to a value obtained by subtracting the threshold of 20 from the luminance value (200) of the subject pixel X1, so as to make the luminance value difference not higher than the threshold. As a result, the luminance value of each peripheral pixel in the dark region 203B is larger than the original luminance value (10) and close to the original luminance value (200) of the subject pixel. In the embodiment, as described above, the value of the subject pixel subjected to the $\epsilon$-filter processing is the sum of luminance values obtained by multiplying the original luminance value of the subject pixel and the adjusted luminance values of the peripheral pixels respectively by ⅑ as a predetermined coefficient.

Thus, the luminance value of the subject pixel subjected to the $\epsilon$-filter processing is obtained to be 193 by rounding the calculation result of (200+200+200+200+200+ 180+200+180+180)/9, which is close to the original luminance value (200) of the subject pixel. Thus, when the $\epsilon$-filter processing is performed on the subject pixel X1 located in the bright region 202B on the border 201B (edge) between a bright region and a dark region so as to smooth the subject pixel X1, the influence of the peripheral pixels in the dark region 203B can be reduced.

Accordingly, in the vicinity of the border (edge) between a bright region and a dark region in the global luminance image (third luminance image data) subjected to the $\epsilon$-filter processing, the bright region is left bright as it is (with a high luminance value in each pixel) while the dark region is left dark (with a low luminance value in each pixel).

Figure 17B:

In this manner, in the first contrast component data obtained by subtracting, from the pixel value of each pixel in the luminance component image (first luminance image data), the pixel value of a corresponding pixel in the global luminance image (third luminance image data) subjected to the $\epsilon$-filter processing, the luminance value of each pixel on the bright region side near the border between the bright region and the dark region becomes identical with each pixel in an independent bright region (such as a background sky) (because the luminance value of the pixel on the bright region side near the border in the $\epsilon$-filter-processed image, which luminance value is subtracted from the luminance value in the original image, is higher as described above). As a result, in the luminance image including the first contrast component data, there is no fear that only the vicinity of the border between the bright region and the dark region becomes bright, and there is no fear that the aforementioned white "belt" appears. FIG. 17B is a view showing the image including the first contrast component data in that case.

In addition, in the first contrast component data, the luminance value of each pixel on the dark region side near the border between the bright region and the dark region becomes equal to the luminance value of each pixel in an independent dark region (such as a human subject against the sun) (because the luminance value of the pixel on the dark region side near the border in the ε-filter-processed image, which luminance value is subtracted from the luminance value in the original image, is lower as described above). As a result, in the luminance image including the first contrast component data, there is no fear that only the vicinity of the border between the bright region and the dark region becomes dark, and there is no fear that the aforementioned black "belt" appears.

For the aforementioned reason, when the first contrast component data are generated by the subtraction processing based on the ε-filter processing, a high-frequency component contained in the original photographed image can be accurately reflected in the image data finally generated as a photographed image even if there is a portion with a very large difference between a bright region and a dark region in the noise-eliminated luminance component image.

As the filter used for generating the third luminance image data (Y_low(x,y)) in the second filter processing portion 73, any other weighted average filter such as a bilateral filter may be used if it is a smoothing filter with edge preserving properties in the same manner as the ε-filter. In this case, it is possible to obtain an effect similar to that when the ε-filter is used.

In the embodiment, smoothing processing using the ε-filter is performed directly on the noise-eliminated luminance component image (second luminance image data) so as to generate the global luminance image (third luminance image data). However, the global luminance image may be generated as follows. That is, it will go well if the global luminance image is an image showing the global brightness condition of each portion of the original image. Therefore, the following manner may be used. After the noise-eliminated luminance component image is once reduced and smoothing processing is performed on the reduced image, the smoothed image is expanded to the original size. The expanded image is used as a global luminance image. In this case, it is possible to shorten the time required for smoothing processing with the ε-filter.

On the other hand in the gradation correction in the gradation correction section 61, a larger correction coefficient is set for a lower brightness level pixel (dark region) in the original image. More specifically, a gain obtained by the gain function shown in FIG. 7A so as to have properties shown in FIGS. 7B and 7C is set as a correction gain in the gradation conversion section 70 by the correction gain calculation section 69. Thus, the luminance level of the low luminance level region is raised. As a result, in the gradation-corrected image data (drc(x, y)), original contrast in the dark region is lost on a large scale. On the contrary the correction coefficient applied to a high brightness level pixel (in a bright region) in the original image is so small that the influence of gradation correction on the bright region is small. Thus, in the gradation-corrected image data (drc(x, y)), original contrast in the bright region is not lost too much.

In terms of this point, in the embodiment, the first luminance correction section 75 in the DSP 6 multiplies the first contrast component data by a correction coefficient which varies in inverse proportion to the magnitude of the luminance value of each pixel (see Step SB5 in FIG. 12). Thus, the first luminance correction is performed to reduce the luminance value of each pixel in the effective luminance range more greatly as the magnitude of its original luminance value is larger. That is, correction is performed so that the luminance value of each pixel in a dark region becomes higher than the luminance value of each pixel in a bright region in the corrected second contrast component data (Y_high2(x, y)).

Thus, a high-frequency component contained in the original photographed image can be reflected more greatly in the dark region (region where the original contrast has been reduced greatly) of the gradation-corrected image data (corrected image). As a result, it is possible to avoid "blackout" in the final photographed image.

At the same time, a high-frequency component contained in the original photographed image can be reflected less in the bright region (region where the original contrast has been reduced only slightly) of the gradation-corrected image data (corrected image). As a result, there is no fear that the luminance value of the bright region exceeds the limit value of the dynamic range so that "whiteout" can be avoided in the final photographed image.

Further, in the embodiment, in the DSP 6, the second luminance correction section 76 performs the second luminance correction upon the second contrast component data so as to reduce noise and cancel discontinuity of pixel values which is caused by the noise reduction between the lower luminance value side and the higher luminance value side with respect to the intermediate range of the effective luminance range. Thus, the third contrast component data (Y_high3(x, y)) is generated. Accordingly, excellent data where the noise component is small and the continuity of pixel values is secured between the lower luminance value side and the higher luminance value side can be obtained as adjustment data to be used for adjusting the brightness of the gradation-corrected image data (corrected image) in the CPU 9.

In addition, the CPU 9 performs the third luminance correction upon the third contrast component data. Thus, the luminance value to be added to the luminance value of each pixel in the bright region of the gradation-corrected image data (corrected image) is made in inverse proportion to the original luminance value of a corresponding pixel of the corrected image (see Step SC2 in FIG. 13). Also in this manner, there is no fear that the luminance value of the bright region exceeds the limit value of the dynamic range so that "whiteout" can be avoided in the final photographed image.

At the same time, in the third luminance correction, the luminance value to be added to the luminance value of each pixel in the dark region of the gradation-corrected image data (corrected image) is made in proportion to the original luminance value of a corresponding pixel of the corrected image. Also in this manner, the luminance value of the dark region in the final photographed image is increased so that "blackout" can be avoided.

In the third luminance correction, the luminance value of each pixel in the bright region of the third contrast component data is multiplied by the coefficient which decreases in inverse proportion to the original luminance value of a corresponding pixel in the corrected image, and the luminance value of each pixel in the dark region of the third contrast component data is multiplied by the coefficient which increases in proportion to the original luminance value of a corresponding pixel in the corrected image. However, the following manner may be used.

For example, the third contrast component data may be multiplied by a characteristic adjustment coefficient in addition to the aforementioned coefficient so that the variation characteristic of the luminance value of each pixel in the bright region or the dark region in the third contrast component data in accordance with the original luminance value of a corresponding pixel in the corrected image can be adjusted in accordance with necessity. In this case, the value of the characteristic adjustment coefficient may be varied automatically in accordance with the photographing mode or the global luminance distribution condition of the corrected image. Alternatively one selected from a plurality of predetermined values may be set automatically as the characteristic adjustment coefficient.

In addition, in the first filter processing portion 72 of the DSP 6, the first contrast component data are generated based on the luminance component image from which noise contained in the luminance component image has been eliminated in advance. As a result, it is possible to obtain the fourth contrast component data ($Y\_high4(x, y)$) which are adjustment data to be used for adjusting the brightness of the gradation-corrected image data (corrected image). That is, it is possible to obtain excellent data as information image data according to the invention. An effect similar to this can be obtained in the following manner. That is, for example, the first filter processing portion 72 is eliminated. The first contrast component data are generated based on the luminance component image from which noise has not been eliminated. Then low pass filter processing is performed on the first contrast component data thus obtained.

Here, in the aforementioned embodiment, the first contrast component data are generated based on the luminance component image (from which noise has been eliminated) including only the luminance component extracted from the YUV data of the photographed image (image to be processed). However, the first contrast component data may be generated in a different manner. For example, only the luminance component is extracted from the gradation-corrected image data ($drc(x, y)$) generated by 25C the gradation correction section 61 so as to obtain a luminance component image. The first contrast component data are generated based on the luminance component image.

In the embodiment, the fourth contrast component data generated through the first luminance correction, the second luminance correction and the third luminance correction are used as the information image data according to the invention. However, the first luminance correction, the second luminance correction and the third luminance correction may be omitted. The first luminance correction, the second luminance correction and the third luminance correction may be performed selectively or may all be eliminated. The filter processing performed by the first filter processing portion 72 of the DSP 6 for eliminating the noise contained in the luminance component image may also be eliminated.

The CPU 9 may be designed to perform a portion or the whole of the signal processing of the DSP 6 based on predetermined image processing programs. On the contrary, the DSP 6 may be designed to perform the third luminance correction and further the brightness adjustment for adjusting the brightness of the corrected image pixel by pixel, instead of the CPU 9.

Method for correcting the gradation of an image to be processed such as a photographed image is not limited to the method described in the embodiment, but the gradation of the photographed image or the like may be corrected by implementing another method including processing for raising the luminance level of a low luminance level region.

The present invention may be applied to a configuration different from those of the digital camera 1 as described as the embodiment. In the configuration, a photographed image of RGB data which has not been converted into YUV data is used as an image to be processed, and gradation correction is performed on the RGB data. In this case, contrast component data including pixel data each having a pixel value in which a high-frequency component contained in the image to be processed is reflected is acquired for each color component data of R, G and B in a manner similar to that in the embodiment. Pixel values of each color component data of gradation-corrected image data are adjusted using the contrast component data.

Further, description has been described here in the case where the image processing apparatus according to the invention is applied to the digital camera 1, in which a photographed image acquired (picked up) in a still image pickup mode is set as an image to be processed, and subjected to the aforementioned image processing. However, the image to be processed may be, for example, a recorded image which has been picked up and recorded on the external memory 10. In addition, the image processing apparatus according to the invention can be implemented not only as a digital camera but also as another apparatus having an image data processing function such as a personal computer.

As described above, according to the invention, it is possible to perform gradation correction on an image to raise the luminance level in a low luminance level region to thereby obtain a high quality image without lowering the global contrast of the image.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. An image processing apparatus comprising:
a gradation correction unit configured to perform gradation correction upon a subject image to be processed to generate a corrected image, the gradation correction comprising processing for lowering contrast in the subject image;
a gradation information acquisition unit configured to acquire gradation information indicating relative balance of brightness in each portion of the subject image; and
an adjustment unit configured to adjust a brightness of the corrected image on a pixel basis based on the gradation information;
wherein the gradation information acquisition unit comprises an information image generation unit configured to generate information image data comprising luminance information reflecting a high-frequency component contained in the subject image, and wherein the gradation information acquisition unit is configured to acquire the information image data as the gradation information;
wherein the information image generation unit comprises a global luminance image generation unit configured to perform filter processing to generate global luminance image data forming a global luminance image indicating a global condition of brightness in the subject image; and wherein the information image generation unit is configured to generate the information image data by performing processing comprising subtraction processing in which a luminance value of each pixel in the global luminance image data is subtracted from a luminance value of a corresponding pixel in the subject image.

2. The apparatus according to claim 1, wherein the processing performed by the information image generation unit further comprises multiplication processing in which a luminance value of each pixel subjected to the subtraction processing is multiplied by a correction coefficient that is in inverse proportion to a luminance value of a corresponding pixel in the global luminance image.

3. The apparatus according to claim 1, wherein the global luminance image generation unit generates the global luminance image by the filter processing using a smoothing filter having edge preserving properties.

4. The apparatus according to claim 3, wherein the smoothing filter is configured to:
adjust a luminance value of each of peripheral pixels located around a subject pixel to cause a differential value between the luminance value of the subject pixel and the luminance value of the peripheral pixel to be not higher than a threshold value; and
set an average value of the luminance value of the subject pixel and the adjusted luminance values of the peripheral pixels as a luminance value of each pixel of the global luminance image.

5. The apparatus according to claim 1, wherein the adjustment unit is configured to add, to the luminance value of each pixel in the corrected image, a luminance value of a corresponding pixel in the information image data so as to adjust brightness in the corrected image on a pixel basis.

6. The apparatus according to claim 1, wherein the gradation information acquisition unit further comprises a gradation information correction unit configured to performs a correction on a luminance value of each pixel in the information image data in accordance with the luminance value, and
wherein the adjustment unit is configured to adjust the brightness in the corrected image on a pixel basis based on the information image data corrected by the gradation information correction unit.

7. An image processing apparatus comprising:
a gradation correction unit configured to perform gradation correction upon a subject image to be processed to generate a corrected image, the gradation correction comprising processing for lowering contrast in the subject image;
a gradation information acquisition unit configured to acquire gradation information indicating relative balance of brightness in each portion of the subject image; and
an adjustment unit configured to adjust brightness of the corrected image on a pixel basis based on the gradation information;
wherein the gradation information acquisition unit comprises an information image generation unit configured to generate information image data comprising luminance information reflecting a high-frequency component contained in the subject image, and wherein the gradation information acquisition unit is configured to acquire the information image data as the gradation information;
wherein the gradation information acquisition unit further comprises a gradation information correction unit configured to perform a correction on a luminance value of each pixel in the information image data in accordance with the luminance value;
wherein the adjustment unit is configured to adjust the brightness in the corrected image on a pixel basis based on the information image data corrected by the gradation information correction unit; and
wherein the gradation information correction unit performs the correction by:
adding a correction luminance value to the luminance value of each pixel in the information image data having a luminance value that is smaller than a first threshold;
subtracting the correction luminance value from the luminance value of each pixel in the information image data having a luminance value that is larger than a second threshold which is larger than the first threshold; and
setting an intermediate luminance value between the first threshold and the second threshold as the luminance value of each pixel in the information image data having a luminance value that is not smaller than the first threshold and not larger than the second threshold.

8. The apparatus according to claim 7, wherein the adjustment unit multiplies, of the pixels in the information image data corrected by the gradation information correction unit, a luminance value of each pixel having a luminance value larger than a predetermined threshold by a correction coefficient which is in inverse proportion to a luminance value of a corresponding pixel in the corrected image.

9. The apparatus according to claim 7, wherein the adjustment unit multiplies, of the pixels in the information image data corrected by the gradation information correction unit, a luminance value of each pixel having a luminance value not larger than a predetermined threshold by a correction coefficient which is in proportion to a luminance value of a corresponding pixel in the corrected image.

10. An image processing apparatus comprising:
a gradation correction unit configured to perform gradation correction upon a subject image to be processed to generate a corrected image, the gradation correction comprising processing for lowering contrast in the subject image;
a gradation information acquisition unit configured to acquire gradation information indicating relative balance of brightness in each portion of the subject image; and
an adjustment unit configured to adjust brightness of the corrected image on a pixel basis based on the gradation information;
wherein the gradation correction unit comprises:
a first determination unit configured to determine which one of a plurality of predetermined brightness levels a brightness level of each of subject region belongs, the subject region being set as each of a plurality of block regions set to cover the subject image;
a second determination unit configured to determine which one of the predetermined brightness levels a brightness level of an adjacent block region belongs, the adjacent block region being set as at least one of the block regions adjacent to the subject region;
a regional correction unit configured to correct the brightness of the subject region based on a combination of the brightness levels determined by the first determination unit and the second determination unit;

a calculation unit configured to calculate a correction coefficient using a correction function for each pixel, the correction coefficient being used when the regional correction unit corrects the brightness of the subject region;

a contrast determination unit configured to determine a contrast condition in the subject image; and an upper limit adjustment unit configured to adjust an upper limit of the correction coefficient for each pixel based on the contrast condition determined by the contrast determination unit.

11. A method for processing an image, the method comprising:

performing gradation correction upon a subject image to be processed to generate a corrected image, the gradation correction comprising processing for lowering contrast in the subject image;

acquiring gradation information indicating relative balance of brightness in each portion of the subject image; and adjusting a brightness of the corrected image on a pixel basis based on the gradation information;

wherein acquiring the gradation information comprises generating information image data comprising luminance information reflecting a high-frequency component contained in the subject image, and acquiring the information image data as the gradation information;

wherein generating the information image data comprises performing filter processing to generate global luminance image data forming a global luminance image indicating a global condition of brightness in the subject image; and wherein the information image data is generated by performing processing comprising subtraction processing in which a luminance value of each pixel in the global luminance image data is subtracted from a luminance value of a corresponding pixel in the subject image.

12. A non-transitory computer readable storage medium having a program executable by a computer stored thereon, the program controlling the computer to perform functions comprising:

performing gradation correction upon a subject image to be processed to generate a corrected image, the gradation correction comprising processing for lowering contrast in the subject image;

acquiring gradation information indicating relative balance of brightness in each portion of the subject image; and adjusting a brightness of the corrected image on a pixel basis based on the gradation information;

wherein acquiring the gradation information comprises generating information image data comprising luminance information reflecting a high-frequency component contained in the subject image, and acquiring the information image data as the gradation information;

wherein generating the information image data comprises performing filter processing to generate global luminance image data forming a global luminance image indicating a global condition of brightness in the subject image; and wherein the information image data is generated by performing processing comprising subtraction processing in which a luminance value of each pixel in the global luminance image data is subtracted from a luminance value of a corresponding pixel in the subject image.

13. A method for processing an image, the method comprising:

performing gradation correction upon a subject image to be processed to generate a corrected image, the gradation correction comprising processing for lowering contrast in the subject image;

acquiring gradation information indicating relative balance of brightness in each portion of the subject image; and adjusting a brightness of the corrected image on a pixel basis based on the gradation information;

wherein acquiring the gradation information comprises generating information image data comprising luminance information reflecting a high-frequency component contained in the subject image, and acquiring the information image data as the gradation information;

wherein acquiring the gradation information further comprises performing a correction on a luminance value of each pixel in the information image data in accordance with the luminance value;

wherein adjusting the brightness in the corrected image is performed on a pixel basis based on the corrected information image data; and wherein performing the correction comprises:

adding a correction luminance value to the luminance value of each pixel in the information image data having a luminance value that is smaller than a first threshold;

subtracting the correction luminance value from the luminance value of each pixel in the information image data having a luminance value that is larger than a second threshold which is larger than the first threshold; and setting an intermediate luminance value between the first threshold and the second threshold as the luminance value of each pixel in the information image data having a luminance value that is not smaller than the first threshold and not larger than the second threshold.

14. A non-transitory computer readable storage medium having a program executable by a computer stored thereon, the program controlling the computer to perform functions comprising:

performing gradation correction upon a subject image to be processed to generate a corrected image, the gradation correction comprising processing for lowering contrast in the subject image;

acquiring gradation information indicating relative balance of brightness in each portion of the subject image; and adjusting a brightness of the corrected image on a pixel basis based on the gradation information;

wherein acquiring the gradation information comprises generating information image data comprising luminance information reflecting a high-frequency component contained in the subject image, and acquiring the information image data as the gradation information;

wherein acquiring the gradation information further comprises performing a correction on a luminance value of each pixel in the information image data in accordance with the luminance value;

wherein adjusting the brightness in the corrected image is performed on a pixel basis based on the corrected information image data; and wherein performing the correction comprises:

adding a correction luminance value to the luminance value of each pixel in the information image data having a luminance value that is smaller than a first threshold;

subtracting the correction luminance value from the luminance value of each pixel in the information image data having a luminance value that is larger than a second threshold which is larger than the first threshold; and setting an intermediate luminance value between the first threshold and the second threshold as the luminance value of each pixel in the information image data having a luminance value that is not smaller than the first threshold and not larger than the second threshold.

15. A method for processing an image, the method comprising:

performing gradation correction upon a subject image to be processed to generate a corrected image, the gradation correction comprising processing for lowering contrast in the subject image;

acquiring gradation information indicating relative balance of brightness in each portion of the subject image; and adjusting a brightness of the corrected image on a pixel basis based on the gradation information;

wherein performing the gradation correction comprises:

making a first determination to determine which one of a plurality of predetermined brightness levels a brightness level of each of subject region belongs, the subject region being set as each of a plurality of block regions set to cover the subject image;

making a second determination to determine which one of the predetermined brightness levels a brightness level of an adjacent block region belongs, the adjacent block region being set as at least one of the block regions adjacent to the subject region;

correcting the brightness of the subject region based on a combination of the brightness levels determined by the first determination and the second determination;

calculating a correction coefficient using a correction function for each pixel, the correction coefficient being used when the brightness of the subject region is corrected;

determining a contrast condition in the subject image; and adjusting an upper limit of the correction coefficient for each pixel based on the determined contrast condition.

16. A non-transitory computer readable storage medium having a program executable by a computer stored thereon, the program controlling the computer to perform functions comprising:

performing gradation correction upon a subject image to be processed to generate a corrected image, the gradation correction comprising processing for lowering contrast in the subject image;

acquiring gradation information indicating relative balance of brightness in each portion of the subject image; and adjusting a brightness of the corrected image on a pixel basis based on the gradation information;

wherein performing the gradation correction comprises:

making a first determination to determine which one of a plurality of predetermined brightness levels a brightness level of each of subject region belongs, the subject region being set as each of a plurality of block regions set to cover the subject image;

making a second determination to determine which one of the predetermined brightness levels a brightness level of an adjacent block region belongs, the adjacent block region being set as at least one of the block regions adjacent to the subject region;

correcting the brightness of the subject region based on a combination of the brightness levels determined by the first determination and the second determination;

calculating a correction coefficient using a correction function for each pixel, the correction coefficient being used when the brightness of the subject region is corrected;

determining a contrast condition in the subject image; and adjusting an upper limit of the correction coefficient for each pixel based on the determined contrast condition.

* * * * *